US008124922B2

(12) United States Patent
Koyama et al.

(10) Patent No.: US 8,124,922 B2
(45) Date of Patent: Feb. 28, 2012

(54) PHOTOELECTRIC CONVERSION DEVICE INCLUDING PHOTOELECTRIC CONVERSION ELEMENT AND AMPLIFIER CIRCUIT HAVING A THIN FILM TRANSISTOR

(75) Inventors: Jun Koyama, Kanagawa (JP);
Yoshifumi Tanada, Kanagawa (JP);
Hideaki Shishido, Kanagawa-ken (JP);
Seiko Amano, Kanagawa (JP); Makoto Yanagisawa, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 264 days.

(21) Appl. No.: 12/467,001

(22) Filed: May 15, 2009

(65) Prior Publication Data

US 2009/0289174 A1    Nov. 26, 2009

(30) Foreign Application Priority Data

May 21, 2008   (JP) ................................. 2008-132835

(51) Int. Cl.
*H01J 40/14*   (2006.01)
(52) U.S. Cl. .............................. 250/214 R; 250/214 SW
(58) Field of Classification Search .............. 250/214 R, 250/214 SW, 214 LA, 205; 327/514; 361/93.1, 361/96; 356/221–226
See application file for complete search history.

(56) References Cited

U.S. PATENT DOCUMENTS 4,831,450 A * 5/1989 Sato et al. ........................ 348/64
5,990,948 A * 11/1999 Sugiki ............................ 348/250

FOREIGN PATENT DOCUMENTS

JP           06-313840       11/1994
JP           2002-286504    10/2002

\* cited by examiner

*Primary Examiner* — Que T Le
(74) *Attorney, Agent, or Firm* — Nixon Peabody LLP; Jeffrey L. Costellia

(57) ABSTRACT

Objects are to accumulate electric charge in a capacitor so that light intensity can be detected even when the amount of incident light is small, and to operate a photoelectric conversion device without increasing the number of elements such as a constant current source or a switch. The photoelectric conversion device includes a photoelectric conversion circuit, a capacitor, and a comparator for comparing a potential of one electrode of the capacitor with a second potential. The photoelectric conversion circuit includes a photoelectric conversion element and an amplifier circuit for amplifying an output current from the photoelectric conversion element In the capacitor, a first potential is supplied through a first switch, and charging or discharging is performed through a second switch in accordance with the current amplified by the amplifier circuit.

21 Claims, 17 Drawing Sheets

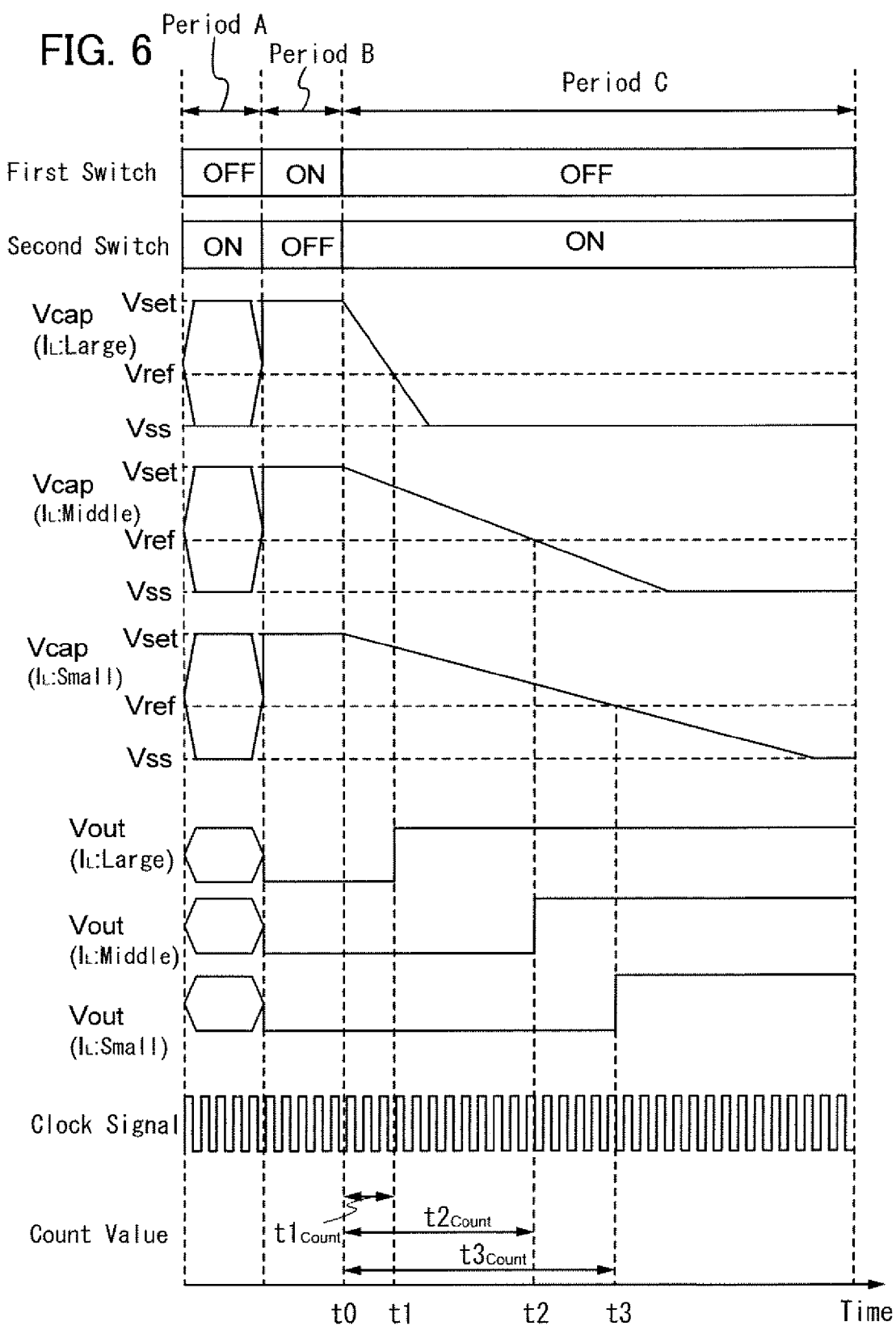

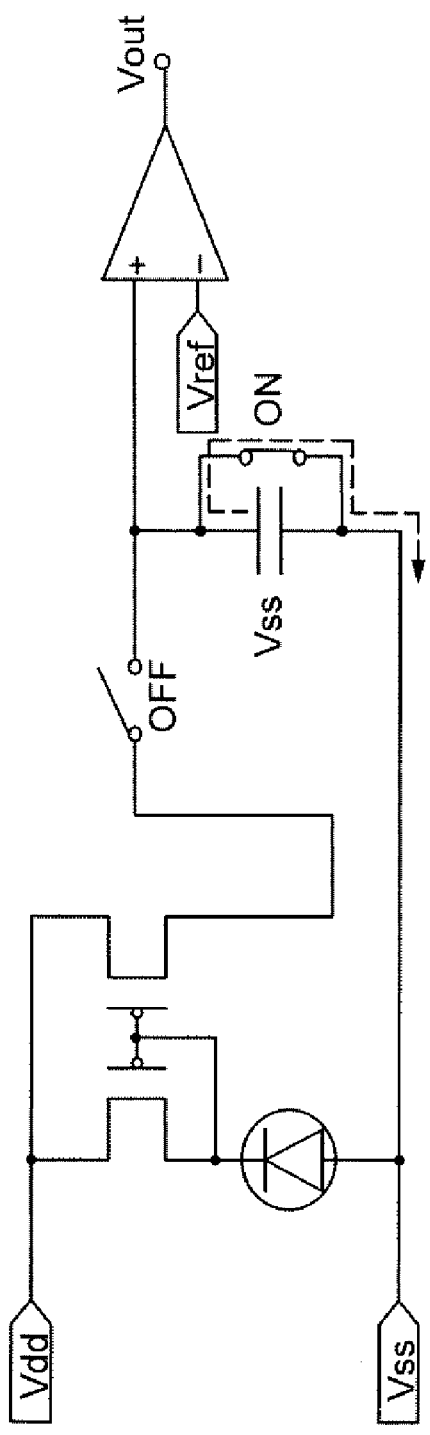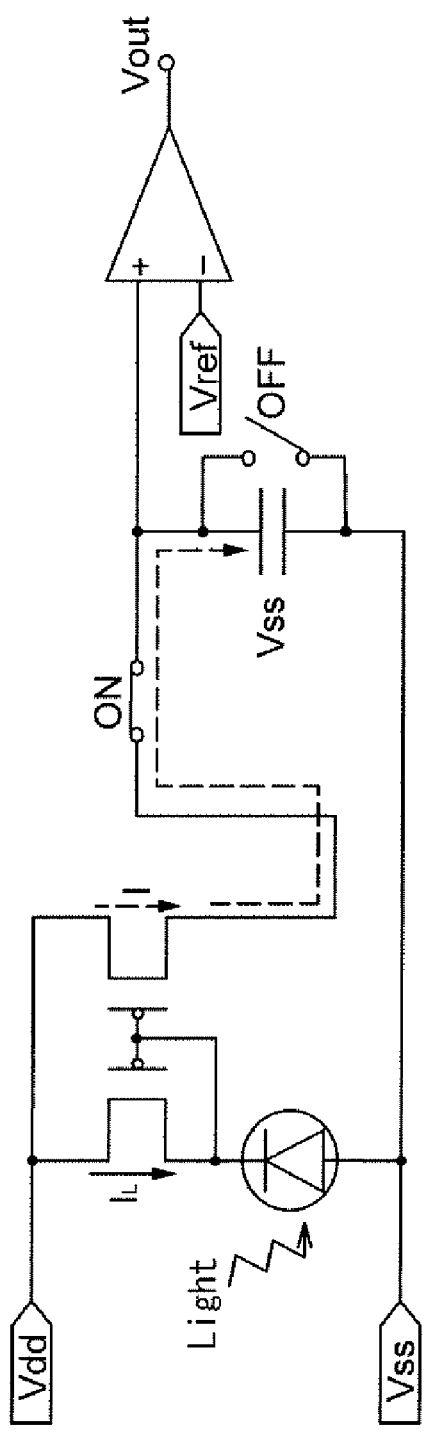
FIG. 13A
FIG. 13B

PHOTOELECTRIC CONVERSION DEVICE INCLUDING PHOTOELECTRIC CONVERSION ELEMENT AND AMPLIFIER CIRCUIT HAVING A THIN FILM TRANSISTOR

BACKGROUND OF THE INVENTION

1. Field of the Invention

The present invention relates to a photoelectric conversion device and a driving method thereof. The present invention particularly relates to a photoelectric conversion device which outputs a digital signal, and a driving method thereof Further, the present invention relates to an electronic device provided with the photoelectric conversion device.

2. Description of the Related Art

A number of photoelectric conversion devices used for detecting an electromagnetic wave are known, and for example, photoelectric conversion devices having sensitivity to light from the ultraviolet range to the infrared range are collectively referred to as optical sensors. Among them, an optical sensor having sensitivity in a visible light range with a wavelength of 400 nm to 700 nm is particularly referred to as a visible optical sensor, and a large number of visible optical sensors are used for devices which need illuminance adjustment on/off control, or the like depending on human living environment.

In some display devices, ambient brightness of the display device is detected to adjust display luminance. This is because the visibility is improved and unnecessary electric power of the display device can be reduced by detecting ambient brightness by an optical sensor to obtain appropriate display luminance. Examples of display devices which have an optical sensor for adjusting luminance are mobile phones and computers with a display portion. In addition, as well as ambient brightness of the display device, luminance of a backlight of a display device, particularly, a liquid crystal display device is detected by an optical sensor to adjust luminance of a display screen.

In an optical sensor which is a photoelectric conversion device, a photoelectric conversion element such as a photodiode is used in a portion for sensing light, and light intensity (also referred to as illuminance) can be detected based on the amount of current which flows into the photoelectric conversion element. Patent Document 1 discloses an electric charge accumulation optical sensor having the following structure. Electric charge which is accumulated in a condenser (a capacitor) with current flowing from a photodiode in accordance with the amount of incident light is discharged by a constant current circuit (a constant current source), so that a changing potential is detected by a comparator. The time taken for change of the potential which is detected by the comparator is output as a digital signal by using a counter circuit and a latch circuit.

[Reference]
[Patent Document 1] Japanese Published Patent Application No. H6-313840

SUMMARY OF THE INVENTION

In the photoelectric conversion device in Patent Document 1, when the amount of current which flows from the photodiode in accordance with the amount of incident light is small, electric charge large enough to detect the amount of incident light is not accumulated in the capacitor. Therefore, it is difficult to detect light intensity in the case where the amount of incident light is small.

Further, in the photoelectric conversion device in Patent Document 1, it is necessary to provide a constant current circuit for discharging electric charge that is accumulated in the capacitor with current flowing from the photodiode in accordance with the amount of incident light. Therefore, control of on (also referred to as conduction or a conducting state) and off (also referred to as non-conduction or a non-conducting state) of each switch for driving the photoelectric conversion device becomes complicated.

It is an object of one embodiment of the present invention to provide a digital signal output type photoelectric conversion device which can detect light intensity by accumulation of electric charge in a capacitor even when the amount of incident light is small. Further, it is another object of one embodiment of the present invention to provide a digital signal output type photoelectric conversion device which can operate without increasing the number of elements such as a constant current source or a switch.

In order to solve the foregoing problems, the photoelectric conversion device is characterized in that after a certain amount of electric charge is accumulated (charged) in the capacitor in advance regardless of the amount of incident light, discharge of the capacitor is performed in accordance with the amount of incident light. According to the present invention, since the amount of discharge of the capacitor varies depending on the amount of incident light, the time taken for change of the potential by discharge which is detected by a comparator is counted by a counter circuit, and a value held in a latch circuit can be output as a digital signal.

One embodiment of the present invention is a photoelectric conversion device that includes a photoelectric conversion circuit including a photoelectric conversion element and an amplifier circuit for amplifying an output current from the photoelectric conversion element; a capacitor to which a first potential is supplied through a first switch and in which charging or discharging is performed through a second switch in accordance with the current amplified by the amplifier circuit; and a comparator for comparing a potential of one electrode of the capacitor with a second potential.

Another embodiment of the present invention is a photoelectric conversion device that includes a photoelectric conversion circuit including a photoelectric conversion element and a circuit that includes a first n-channel transistor into which an output current from the photoelectric conversion element flows, and a second n-channel transistor into which a current of the amplified output current flows; a capacitor that is charged by supply of a first potential through a first switch, and is discharged when the capacitor is electrically connected to a first terminal of the second n-channel transistor through a second switch; and a comparator for comparing a potential of one electrode with a second potential.

In one embodiment of the photoelectric conversion device of the present invention, the comparator may output a result of comparison of the potential of one electrode of the capacitor with the second potential as an output signal.

In one embodiment of the present invention, the photoelectric conversion device may include a clock generation circuit for generating and outputting a clock signal; a counter circuit for counting up a count value by the clock signal and outputting the count value in accordance with the output signal; and a latch circuit for holding the count value.

In one embodiment of the present invention, the photoelectric conversion device may include a plurality of second n-channel transistors. First terminals of the plurality of second n-channel transistors may be electrically connected to each other, and second terminals of the plurality of second n-channel transistors may be electrically connected to each other.

In one embodiment of the photoelectric conversion device of the present invention, the first n-channel transistor, the second n-channel transistor, the first switch, and the second switch may be thin film transistors.

Another embodiment of the present invention is a photoelectric conversion device that includes a photoelectric conversion circuit including a photoelectric conversion element and a current mirror circuit that includes a first p-channel transistor into which an output current from the photoelectric conversion element flows, and a second p-channel transistor into which an amplified current of the output current flows; a capacitor that is discharged by supply of a first potential through a first switch, and is charged when the capacitor is electrically connected to a first terminal of the second p-channel transistor through a second switch; and a comparator for comparing a potential of one electrode of the capacitor with a second potential.

In one embodiment of the photoelectric conversion device of the present invention, the comparator may output a result of comparison of the potential of one electrode of the capacitor with the second potential as an output signal.

In one embodiment of the present invention, the photoelectric conversion device may include a clock generation circuit for generating and outputting a clock signal; a counter circuit for counting up a count value by the clock signal and outputting the count value in accordance with the output signal; and a latch circuit for holding the count value.

In one embodiment of the present invention, the photoelectric conversion device may include a plurality of second p-channel transistors. First terminals of the plurality of second n-channel transistors may be electrically connected to each other, and second terminals of the plurality of second n-channel transistors may be electrically connected to each other.

In one embodiment of the photoelectric conversion device of the present invention, the first p-channel transistor, the second p-channel transistor, the first switch, and the second switch may be thin film transistors.

In one embodiment of the present invention, the photoelectric conversion device may be formed over a light-transmitting substrate.

Another embodiment of the present invention is a method for driving a photoelectric conversion device including a first switch; a second switch; a capacitor; a photoelectric conversion circuit including a photoelectric conversion element and a current mirror circuit that includes a first n-channel transistor into which an output current from the photoelectric conversion element flows, and a second n-channel transistor into which an amplified current of the output current flows; and a comparator for comparing a potential of one electrode of the capacitor with a second potential. The method includes the steps of: charging the capacitor with a first potential when the first switch is turned on and the second switch is turned off; discharging the capacitor in accordance with the current flowing into the first n-channel transistor when the first switch is turned off and the second switch is turned on, and outputting a result of comparison of the potential of one electrode of the capacitor with the second potential as an output signal from the comparator.

Still another embodiment of the present invention is a method for driving a photoelectric conversion device including a first switch; a second switch; a capacitor; a photoelectric conversion circuit including a photoelectric conversion element and a current mirror circuit that includes a first p-channel transistor into which an output current from the photoelectric conversion element flows, and a second p-channel transistor into which a current of the amplified output current flows; and a comparator for comparing a potential of one electrode of the capacitor with a second potential. The method includes the steps of discharging the capacitor with a first potential when the first switch is turned on and the second switch is turned off, charging the capacitor in accordance with the current flowing into the first p-channel transistor when the first switch is turned off and the second switch is turned on, and outputting a result of comparison of the potential of one electrode of the capacitor with the second potential as an output signal from the comparator.

In another embodiment of the method for driving a photoelectric conversion device of the present invention, the photoelectric conversion device may include a latch circuit a counter circuit, and a clock generation circuit. The method may include the steps of: outputting a clock signal from the clock generation circuit at the same time when the first switch is turned off and the second switch is turned on, counting up a count value by the counter circuit in accordance with the clock signal, and holding the count value by the latch circuit based on the output signal.

With one embodiment of the photoelectric conversion device and the driving method of the photoelectric conversion device, even when the amount of incident light is small, electric charge is accumulated in a capacitor so that light intensity can be detected, and the photoelectric conversion device can operate without increasing the number of elements such as a constant current source or a switch.

BRIEF DESCRIPTION OF THE DRAWINGS

In the accompanying drawings:
FIG. 6 is a timing chart illustrating Embodiment 1;
FIGS. 13A and 13B are circuit diagrams illustrating Embodiment 2.

DETAILED DESCRIPTION OF THE INVENTION

Figure 1:
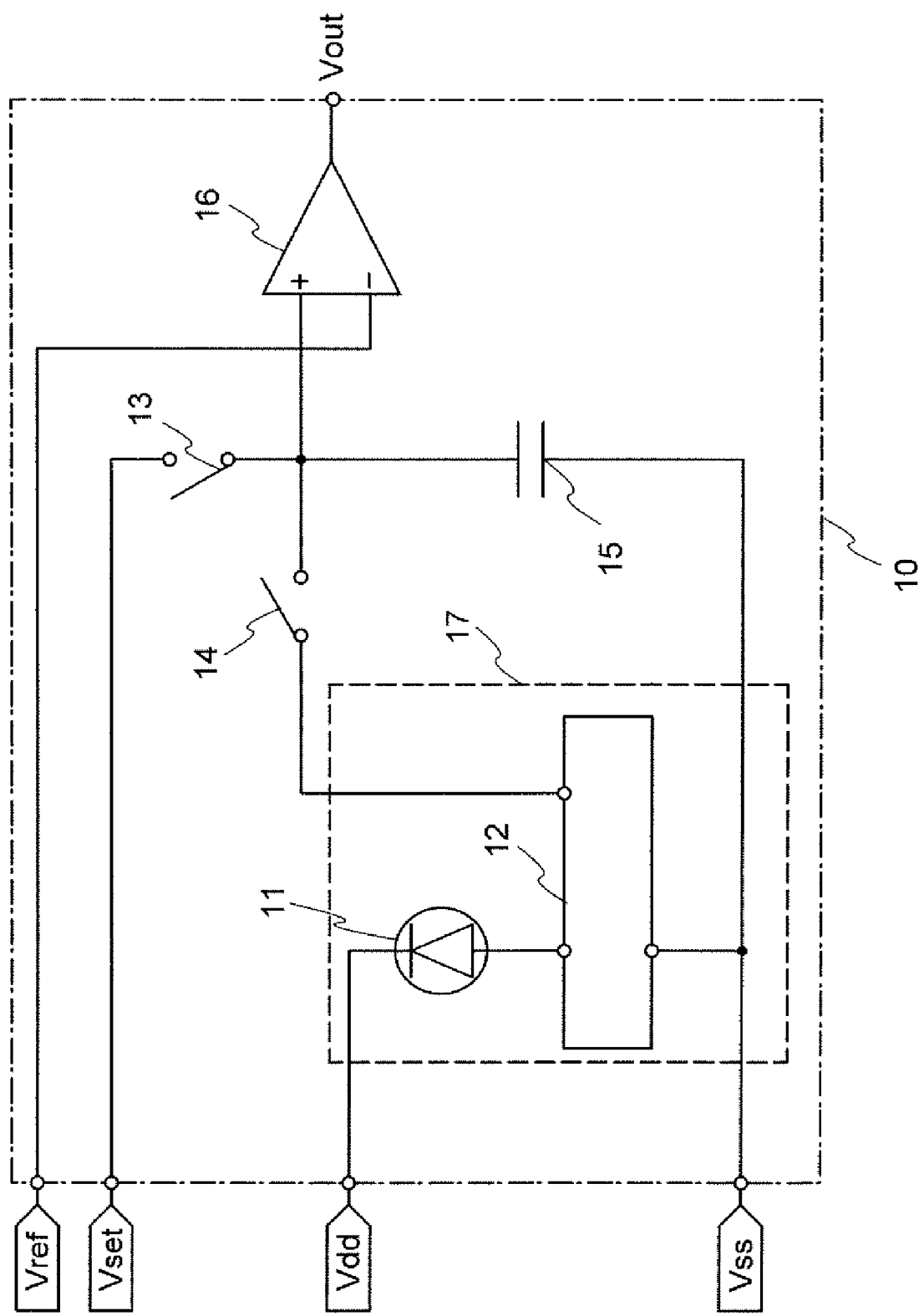
FIG. 1 is a circuit diagram illustrating Embodiment 1.

Hereinafter, embodiments of the present invention will be described with reference to the accompanying drawings. Note that the present invention can be implemented in many different modes, and it is to be easily understood by those skilled in the art that modes and details of the present invention can be variously changed without departing from the spirit and the scope of the present invention. Therefore, the present invention is not construed as being limited to the description of the following embodiments. Note that in the drawings for illustrating the embodiments, the same portions or portions having similar functions are denoted by the same reference numerals, and the description is not repeated.

Embodiment 1

In this embodiment, a structure and an operation of a photoelectric conversion device are described. Note that a photoelectric conversion device of the present invention described in this embodiment includes a circuit for converting an analog signal which indicates the amount of incident light obtained from a photoelectric conversion element into a digital signal.

First, a circuit diagram of the photoelectric conversion device is described. A photoelectric conversion device 10 illustrated in FIG. 1 includes a photoelectric conversion element 11, an amplifier circuit 12, a first switch 13, a second switch 14, a capacitor 15, and a comparator 16 (also referred to as a comparison circuit). A high power supply potential (Vdd) is supplied to one terminal (the n-type semiconductor side) of the photoelectric conversion element 11, and the other terminal (the p-type semiconductor side) is electrically connected to an input terminal of the amplifier circuit 12. The amplifier circuit 12 is a circuit for amplifying the output current from the photoelectric conversion element 11. A low power supply potential (Vss) is supplied to the amplifier circuit 12. Note that the photoelectric conversion element 11 and the amplifier circuit 12 may be collectively referred to as a photoelectric conversion circuit 17. A first potential (also referred to as a charging potential or Vset) is supplied to a first terminal of the first switch 13, and a second terminal of the first switch 13 is electrically connected to one electrode of the capacitor 15, a first terminal of the second switch 14, and a non-inverting input terminal of the comparator 16. The low power supply potential is supplied to the other electrode of the capacitor 15. The second terminal of the second switch 14 is electrically connected to the amplifier circuit 12. A second potential (also referred to as a reference potential or Vref) is supplied to an inverting input terminal of the comparator 16, and an output signal (hereinafter also referred to as Vout) is output from an output terminal of the comparator 16.

The circuit diagram illustrated in FIG. 1 is described. In the photoelectric conversion device 10 in FIG. 1, the first potential is supplied to the capacitor through the first switch 13, whereby electric charge is charged or discharged. After a predetermined amount of electric charge is held in one electrode of the capacitor 15, electric charge is charged in or discharged from the capacitor 15 in accordance with the amount of incident light to the photoelectric conversion element 11. The charging or discharging amount of electric charge in or from the capacitor 15 varies depending on the amount of incident light. Therefore, by comparing the potential of one electrode of the capacitor 15 with the second potential, the comparator 16 outputs an output signal from the output terminal, and a counter circuit and a latch circuit can convert the output signal into a digital signal by detecting the time taken for change of the potential of the output signal.

Note that the amplifier circuit in this specification refers to a circuit which generates an amplified current from a current flowing into the photoelectric conversion element. The amplified current is proportional to the current flowing into the photoelectric conversion element. Depending on the path through which the current amplified by the amplifier circuit flows, charging or discharging of electric charge is performed in the capacitor.

Figure 2:
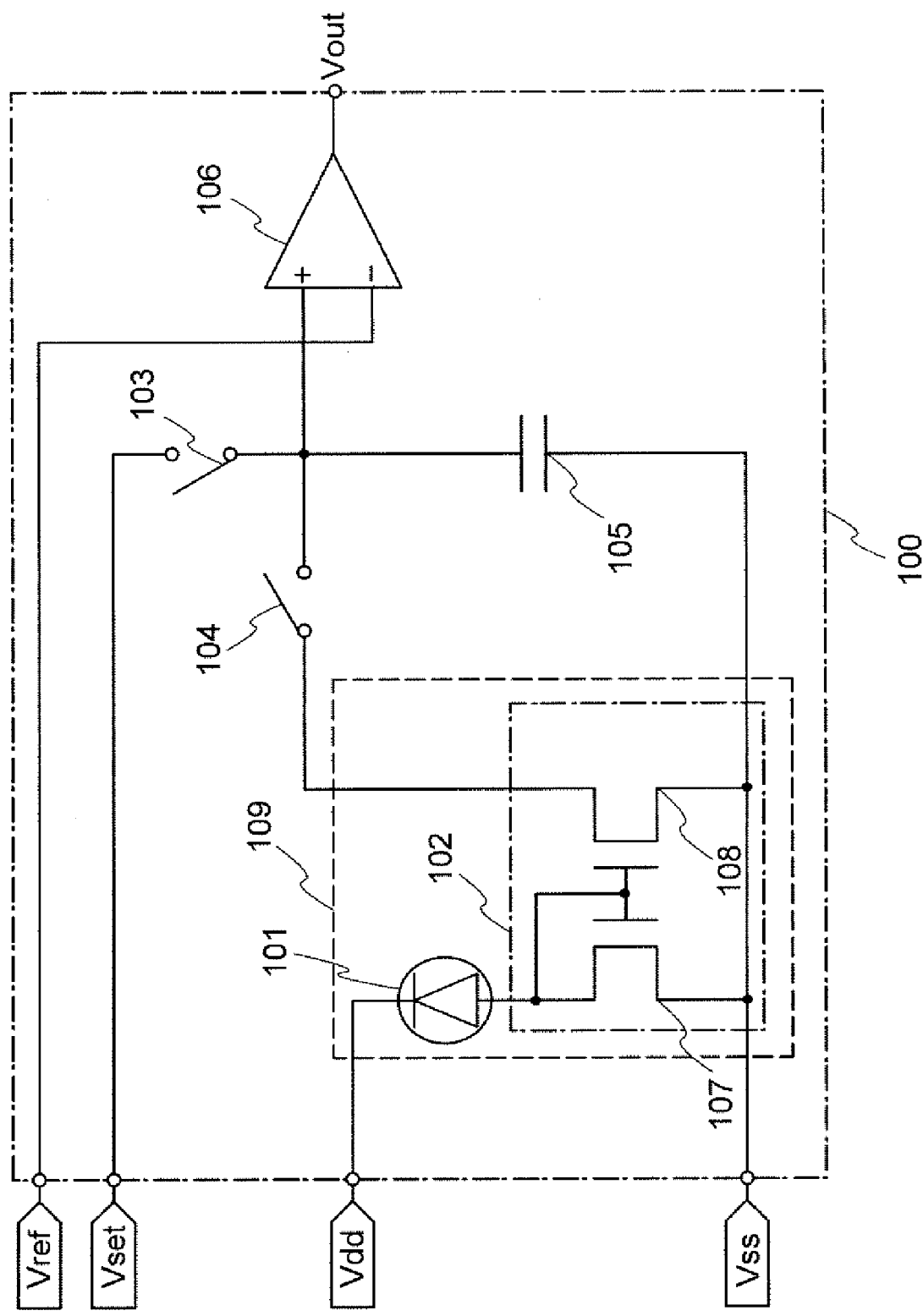
FIG. 2 is a circuit diagram illustrating Embodiment 1.

Next, FIG. 2 specifically illustrates the photoelectric conversion device illustrated in FIG. 1. A photoelectric conversion device 100 in FIG. 2 includes a photoelectric conversion element 101, an amplifier circuit 102, a first switch 103, a second switch 104, a capacitor 105, and a comparator 106. The high power supply potential (Vdd) is supplied to one terminal (the n-type semiconductor side) of the photoelectric conversion element 101, and the other terminal (the p-type semiconductor side) is electrically connected to an input terminal of the amplifier circuit 102. As illustrated in FIG. 2, the amplifier circuit 102 is constituted by a current mirror circuit which includes a first n-channel transistor 107 and a second n-channel transistor 108. Gate terminals of the first n-channel transistor 107 and the second n-channel transistor 108 are electrically connected to each other, and a first terminal of the first n-channel transistor 107 is electrically connected to the gate terminals of the first n-channel transistor 107 and the second n-channel transistor 108. The low power supply potential (Vss) is supplied to second terminals of the first n-channel transistor 107 and the second n-channel transistor 108. Note that the photoelectric conversion element 101 and the amplifier circuit 102 including the first n-channel transistor 107 and the second n-channel transistor 108 may be collectively referred to as a photoelectric conversion circuit 109. The first potential is supplied to a first terminal of the first switch 103, and a second terminal of the first switch 103 is electrically connected to one electrode of the capacitor 105, a first terminal of the second switch 104, and a non-inverting input terminal of the comparator 106. The low power supply potential is supplied to the other electrode of the capacitor 105. A second terminal of the second switch 104 is electrically connected to a first terminal of the second n-channel transistor 108. The second potential is supplied to an inverting input terminal of the comparator 106, and an output signal is output from an output terminal of the comparator 106.

Note that terms such as first, second, third to N-th (N is a natural number) seen in this specification are used in order to avoid confusion between components and do not set a limitation on number.

Note that in this specification, the phrase "A is connected to B" includes the case where A is electrically connected to B as well as the case where A is directly connected to B. Here, the phrase "A is electrically connected to B" means, when an object having an electric function is placed between A and B, the case where a portion between A and B, which includes the object, can be considered as a node.

Specifically, the above phrase includes the case the portion between A and B can be considered as the node when the circuit operation is considered, such as the case where A and B are connected through a switching element such as a transistor and have substantially the same potential by turning on the switch element, and the case where A and B are connected through a resistor and the difference of potentials generated between opposite ends of the resistor does not affect the operation of the circuit including A and B.

Note that in this specification, a switch is not limited to a specific element as long as conduction or non-conduction between one terminal and the other terminal can be controlled. Examples of the switch are an electric switch and a mechanical switch, and a thin film transistor may be used as the switch, for example.

Figure 3:
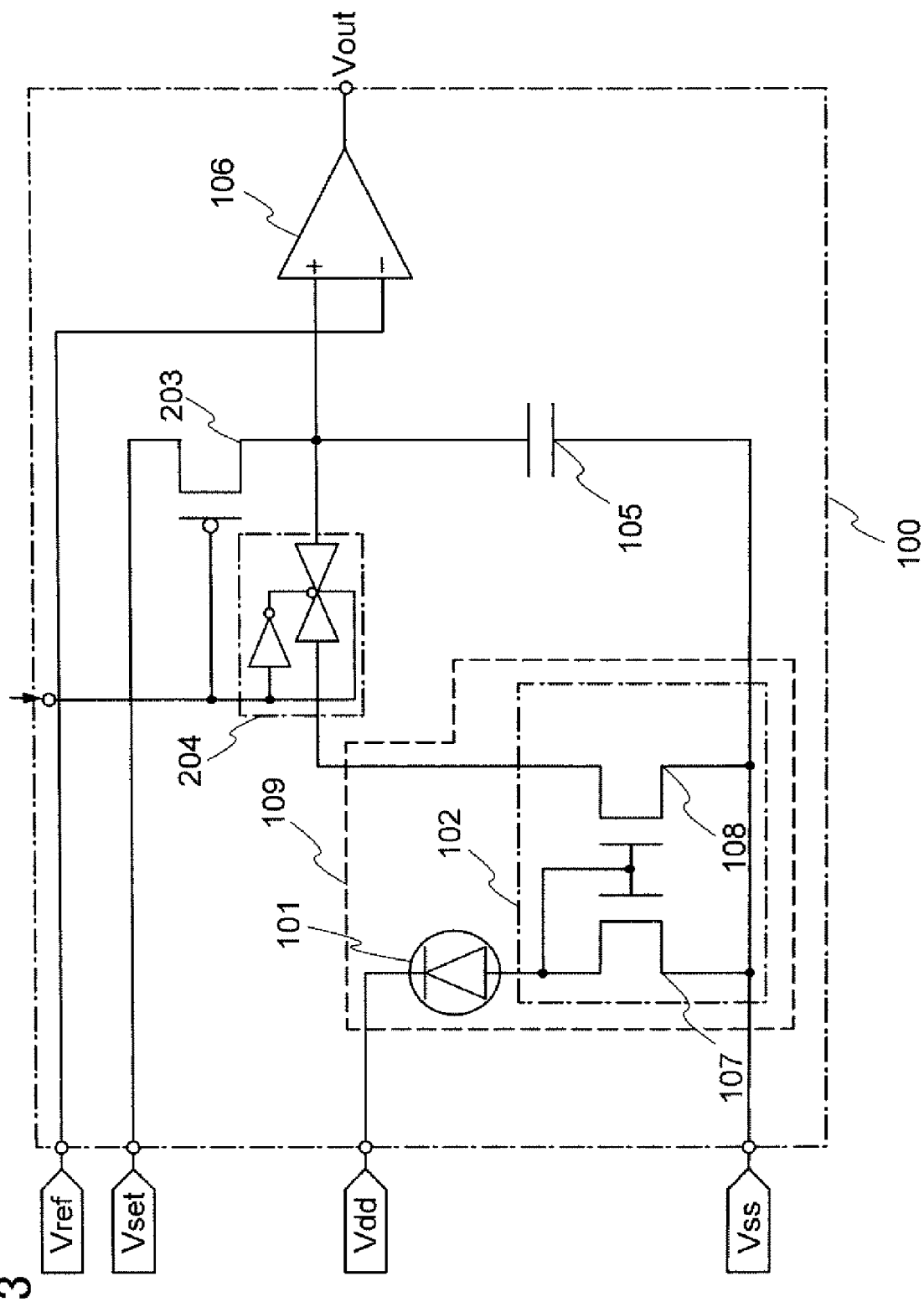
FIG. 3 is a circuit diagram illustrating Embodiment 1.

Note that as illustrated in FIG. 3, a p-channel transistor 203 and an analog switch 204 are preferably used as the first switch 103 and the second switch 104, respectively. Since one terminal of the first switch 103 is electrically connected to the first potential Vset which is a fixed potential, a p-channel transistor can be used. Further, since the potentials of both terminals of the second switch 104 are changed, an analog switch is preferably used in order to surely control on and off.

Moreover, when the p-channel transistor 203 and the analog switch 204 are electrically connected to each other as illustrated in FIG. 3, the first switch 103 and the second switch 104 can be alternately turned on and off. As a result, the first switch 103 and the second switch 104 can operate with one signal from a control circuit which is provided outside the photoelectric conversion device 100, whereby manufacturing costs can be reduced. Note that conduction or non-conduction of the first switch 103 and the second switch 104 may be controlled by one signal as illustrated in FIG. 3 or by inputting a signal to each switch.

Note that a transistor such as an n-channel transistor and a p-channel transistor is an element which has at least three terminals of a gate, a drain, and a source. Each transistor has a channel region between a drain region and a source region, and current can flow through the drain region, the channel region, and the source region. Here, since the source and the drain of the transistor change depending on the structure, the operating condition, and the like of the transistor, it is sometimes difficult to define which is a source or a drain. Therefore, in this embodiment, the regions functioning as the source and the drain are referred to as a first terminal and a second terminal. Further, a terminal functioning as a gate is referred to as a gate terminal.

Note that as a transistor such as the n-channel transistor and the p-channel transistor, a variety of types of transistors can be used. For example, a thin film transistor (TFT) including a non-single-crystal semiconductor film typified by amorphous silicon, polycrystalline silicon, microcrystalline (also referred to as microcrystal or semi-amorphous) silicon, or the like can be used. When a TFT is used, a comparatively low temperature process can be employed to manufacture a photoelectric conversion device, whereby a large-sized manufacturing apparatus can be used to manufacture the photoelectric conversion device over a large-sized substrate. Accordingly, a large number of photoelectric conversion devices can be obtained in one manufacturing process, resulting in low manufacturing costs. Further, a comparatively low temperature process is employed to manufacture a photoelectric conversion device, whereby a substrate with low heat resistance can be used. Accordingly, a transistor can be manufactured over a light-transmitting substrate (e.g., a glass substrate having an insulating surface), and the transistor formed over a light-transmitting substrate with low heat resistance can be used for a device which utilizes transmission of light.

Figure 4:
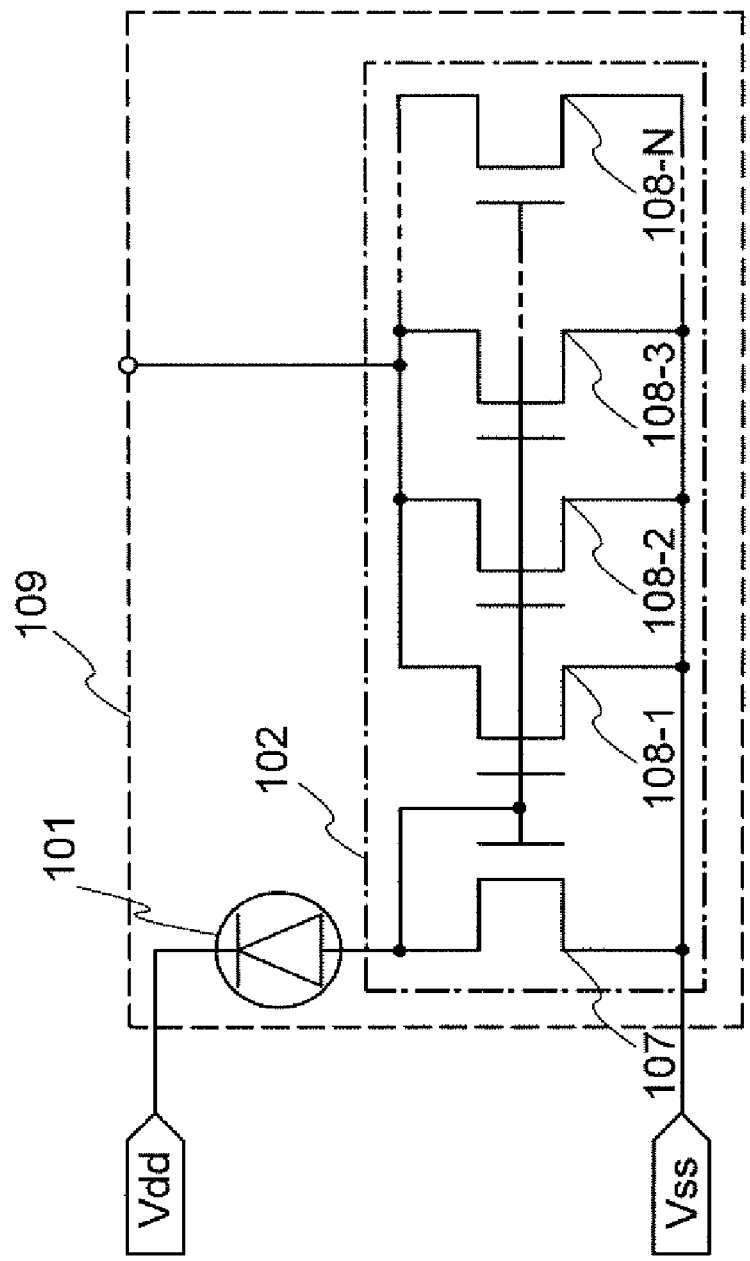
FIG. 4 is a circuit diagram illustrating Embodiment 1.

Note that in the amplifier circuit 102 of the photoelectric conversion circuit 109, a plurality of second n-channel transistors 108 may be electrically connected in parallel as illustrated FIG. 4. As illustrated in FIG. 4, by providing a plurality of second n-channel transistors 108-1 to 108-N (N is a natural number of two or more), current which is N times the amount of current that flows between the source and the drain of the first n-channel transistor when the photoelectric conversion element 101 is irradiated with light can flow through the second n-channel transistors 108-1 to 108-N. Therefore, even when the amount of incident light to the photoelectric conversion element 101 is small, enough current to obtain an output signal can flow through the second n-channel transistors 108-1 to 108-N. Alternatively, sufficient current can flow by increasing the channel width of the second n-channel transistor 108 or reducing the channel length of the second n-channel transistor 108.

Note that the capacitor 105 is charged with the first potential Vset when the first switch 103 is turned on, and after that, the capacitor 105 is discharged depending on the current flowing through the photoelectric conversion circuit 109 when the second switch 104 is turned on. Therefore, the capacitor 105 preferably has capacitance for storing electric charge in consideration of the time for discharging electric charge from the second n-channel transistor in the amplifier circuit 102. Further, the first potential Vset is preferably set to be equal to or less than the high power supply potential Vdd and larger than the low power supply potential Vss. Note that when the first potential Vset is the high power supply potential Vdd, the high power supply potential Vdd is preferably a fixed potential.

The second potential Vref supplied to the inverting input terminal of the comparator 106 is a potential to be compared with the potential of one electrode of the capacitor 105 which is charged with the first potential Vset when the first switch 103 is turned on, and then is discharged by the amplifier circuit 102, so that the output signal Vout is output from the output terminal. The second potential Vref is preferably set to be smaller than the first potential Vset and larger than the low power supply potential Vss. As the output signal Vout, an H level signal or an L level signal is output.

Next, a structure which includes a block diagram of a structure for generating a signal for converting an analog signal into a digital signal in addition to the circuit diagram described in FIG. 2 is described with reference to FIG. 5. A digital output type photoelectric conversion device 400 illustrated in FIG. 5 includes a constant voltage circuit 401 (also referred to as a regulator), a control circuit 402, a latch circuit 403, a counter circuit 404, a clock generation circuit 405, and an interface circuit 406 in addition to the photoelectric conversion device 100 illustrated in FIG. 2.

The constant voltage circuit 401 is a circuit for generating a plurality of potentials such as the first potential Vset and the second potential Vref from the high power supply potential Vdd and the low power supply potential Vss which are input to the digital output type photoelectric conversion device 400. Moreover, the constant voltage circuit 401 supplies potentials for driving the control circuit 402, the latch circuit 403, the counter circuit 404, the clock generation circuit 405, or the interface circuit 406 as necessary.

The control circuit 402 is a circuit for switching on and off the first switch 103 and the second switch 104 in the photoelectric conversion device 100 and is a circuit for outputting a signal for resetting the latch circuit 403 and the counter circuit 404. Moreover, the control circuit 402 is a circuit for synchronizing signals of the latch circuit 403, the counter circuit 404, the clock generation circuit 405, or the interface circuit 406.

The latch circuit 403 is a circuit for holding a count value which is output from the counter circuit 404 based on the output signal Vout output from the photoelectric conversion device 100. The count value held in the latch circuit 403 is output to the interface circuit 406 as a digital signal.

The counter circuit 404 is a circuit for counting based on a clock signal (CLK) output from the clock generation circuit 405. The count value obtained in the counter circuit 404 based on the clock signal is output to the latch circuit 403. Note that since the count value is output as a digital signal, the count value is output to the latch circuit using buses with the number based on the number of bits.

The clock generation circuit 405 is a circuit for outputting the clock signal CLK which is counted in the counter circuit 404 to the counter circuit 404. The clock generation circuit may include, for example, a solid oscillator or a CR oscillator.

As the interface circuit 406, the I2C (Inter Integrated Circuit) interface which is a kind of digital serial interface may be used, for example. The I2C interface is connected to an external device by an I2C bus which includes a serial data line (SDA) for data communication with another device and a serial clock line (SCL) for controlling and synchronizing the data communication with another device. In a circuit which is connected to the I2C interface, response or non-response is selected by a unique address so that data can be communicated between circuits. Note that other than the I2C bus, a bus standard such as the Universal Serial Bus or the Serial Peripheral Interface can be used.

Figure 5:
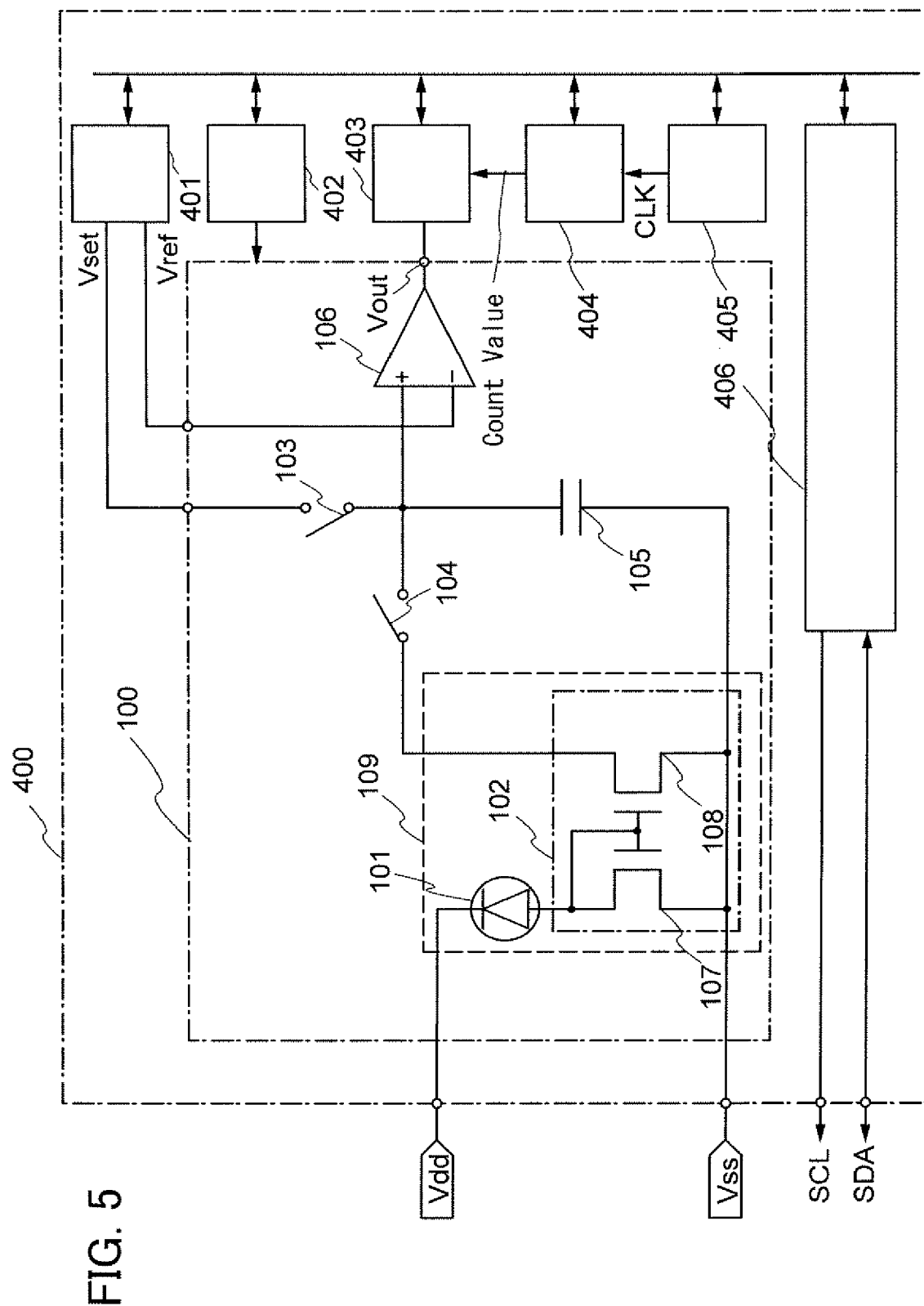
FIG. 5 is a circuit diagram illustrating Embodiment 1.

Next, a specific operation of the digital output type photoelectric conversion device 400 illustrated in FIG. 5 is described with reference to FIG. 6 and FIGS. 7A and 7B. FIG. 6 is a timing chart illustrating a potential Vcap of one electrode of the capacitor 105 when on and off of the first switch 103 and the second switch 104 are switched, the potential Vout of an output signal of the comparator 106, a clock signal, and a count value. Note that in the following description of Vcap and Vout, the amount of photocurrent $I_L$ generated when the photoelectric conversion element 101 is irradiated with light is classified into three levels of large, middle, and small.

First, a period A in which the first switch 103 is off and the second switch 104 is on illustrated in FIG. 6 is described. In the period A, the potential Vcap of one electrode of the capacitor 105 continues to be changed in accordance with the amount of photocurrent $I_L$ and is not fixed. Further, in the period A, the potential Vout of the output signal of the comparator 106 continues to be changed in accordance with the potential of Vcap and is not fixed. Note that the clock signal is output from the clock generation circuit 405 to the counter circuit 404 in the period A. Accordingly, in the counter circuit 404, the count value is counted up, but is not held in the latch circuit 403 in the period A.

Next, a period B in which the first switch 103 is on and the second switch 104 is off is described. In the period B, the potential Vcap of one electrode of the capacitor 105 is set to the first potential Vset regardless of the amount of photocurrent $I_L$. Further, in the period B, as the potential Vout of the output signal of the comparator 106, the L level signal is output regardless of the amount of photocurrent $I_L$ because the first potential Vset is higher than the second potential Vref.

Figure 7A:
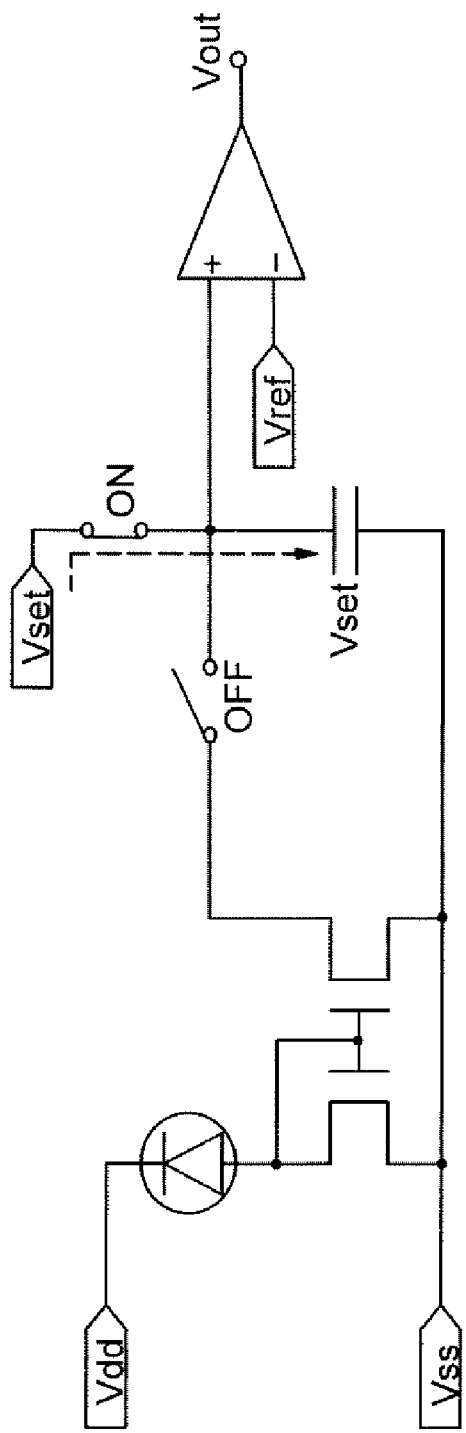
FIGS. 7A and 7B are circuit diagrams illustrating Embodiment 1.

FIG. 7A schematically illustrates on or off of each switch and the flow of electric charge in the period B. The first switch 103 is turned on, whereby the first potential Vset is supplied to the capacitor 105. Since the second switch 104 is off electric charge is not transferred from the capacitor 105 to the second n-channel transistor 108.

Next, a period C in which the first switch 103 is off and the second switch 104 is on is described. First, in the period C, in the case where the amount of photocurrent $I_L$ is large when the photoelectric conversion element 101 is irradiated with light ($I_L$: large in FIG. 6), the amount of current I which flows into the second n-channel transistor 108 increases in accordance with the photocurrent $I_L$, so that the potential Vcap of one electrode of the capacitor 105 decreases. Accordingly, the potential Vcap of the capacitor 105, which is Vset at the time $t_0$ (time $t_0$<time $t_1$<time $t_2$<time $t_3$), becomes the potential Vref at the time $t_1$, and then becomes the potential Vss when discharge from the capacitor 105 is finished. At this time, as the potential Vout of the output signal of the comparator 106, the H level signal is output when the potential Vcap of the capacitor is changed from the first potential Vset to the second potential Vref. Then, the count value is input and held in the latch circuit 403 by the signal. Note that the counter circuit 404 and the latch circuit 403 are reset at the same time as the time $t_0$ when the period C starts, and the counter circuit 404 counts up based on the clock signal. Then, the potential Vout of the output signal of the comparator 106 is input to the latch circuit 403 at the time $t_1$, so that a count value $t1_{count}$ based on the clock signal in the period from the time $t_0$ to the time $t_1$ can be obtained.

In the period C in which the first switch 103 is off and the second switch 104 is on, in the case where the amount of photocurrent $I_L$ is middle when the photoelectric conversion element 101 is irradiated with light ($I_L$: middle in FIG. 6), the amount of current I which flows into the second n-channel transistor 108 is smaller than that in the case where the amount of photocurrent $I_L$ is larger. Thus, although the rate of decrease is low, the potential Vcap of one electrode of the capacitor 105 decreases. Accordingly, the potential Vcap of the capacitor 105, which is Vset at the time $t_0$, becomes the potential Vref at the time $t_2$, and then becomes the potential Vss when discharge from the capacitor 105 is finished. At this time, as the potential Vout of the output signal of the comparator 106, the H level signal is output when the potential Vcap of the capacitor is changed from the first potential Vset to the second potential Vref. Then, the count value is input and held in the latch circuit 403 by the signal. Note that the counter circuit 404 and the latch circuit 403 are reset at the same time as the time $t_0$ when the period C starts, and the counter circuit 404 counts up based on the clock signal. Then, the potential Vout of the output signal of the comparator 106 is input to the latch circuit 403 at the time $t_2$, so that a count value $t2_{count}$ based on the clock signal in the period from the time $t_0$ to the time $t_2$ can be obtained.

In the period C in which the first switch 103 is off and the second switch 104 is on, in the case where the amount of photocurrent $I_L$ is small when the photoelectric conversion element 101 is irradiated with light ($I_L$: small in FIG. 6), the amount of current I which flows into the second n-channel transistor 108 is smaller because the amount of photocurrent $I_L$ is smaller, whereby the potential Vcap of one electrode of the capacitor 105 decreases although the rate of decrease is low. Accordingly, the potential Vcap of the capacitor 105, which is Vset at the time $t_0$, becomes the potential Vref at the time $t_3$, and then becomes the potential Vss when discharge from the capacitor 105 is finished. At this time, as the potential Vout of the output signal of the comparator 106, the H level signal is output when the potential Vcap of the capacitor is changed from the first potential Vset to the second potential Vref. Then, the count value is input and held in the latch circuit 403 by the signal. Note that the counter circuit 404 and the latch circuit 403 are reset at the same time as the time $t_0$ when the period C starts, and the counter circuit 404 counts up based on the clock signal. Then, the potential Vout of the output signal of the comparator 106 is input to the latch circuit 403 at the time $t_3$, so that a count value $t3_{count}$ based on the clock signal in the period from the time $t_0$ to the time $t_3$ can be obtained.

Figure 7B:
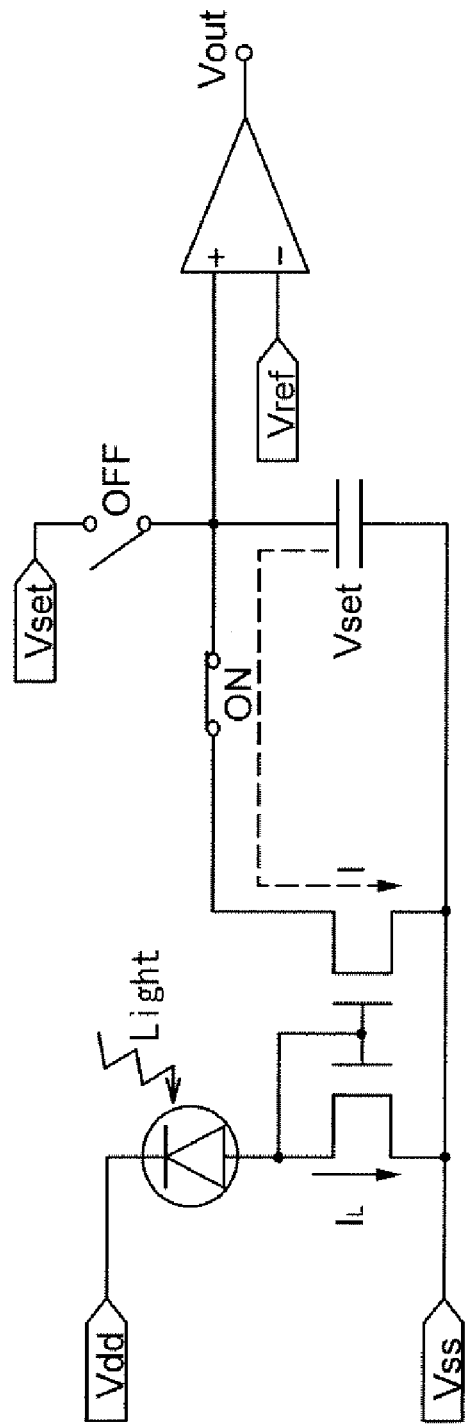

FIG. 7B schematically illustrates on or off of each switch and the flow of electric charge in the period C. Since the first switch 103 is turned off, the first potential Vset is not additionally supplied to the capacitor 105. On the other hand, since the second switch 104 is turned on, the current I flows from the capacitor 105 to the second n-channel transistor 108, whereby discharge of the capacitor 105 is performed. Note that since the amplifier circuit 102 constitutes a current mirror circuit, the amount of current I which flows into the second n-channel transistor 108 is proportional to the amount of photocurrent $I_L$.

Note that in the period C in which the first switch 103 is off and the second switch 104 is on, in the case where the photocurrent $I_L$ is not detected because the photoelectric conversion element 101 is not irradiated with light, the current I which flows into the second n-channel transistor 108 is not generated, whereby the potential Vcap of one electrode of the capacitor 105 hardly decreases. Therefore, the potential Vcap of the capacitor 105 is Vset at the time $t_0$ and is not changed to the potential Vref over time. At this time, since the potential Vcap of the capacitor is not changed from the first potential Vset to the second potential Vref the L level signal is continuously output as the potential Vout of the output signal of the comparator 106. Moreover, the clock signal is output to the counter circuit 404 from the time $t_0$ when the period C starts. Accordingly, the above count value in accordance with the photocurrent $I_L$ cannot be obtained, and the count value reaches the maximum value in the counter circuit. In this case, the maximum value of the count value is preferably output to the latch circuit.

Figure 8:
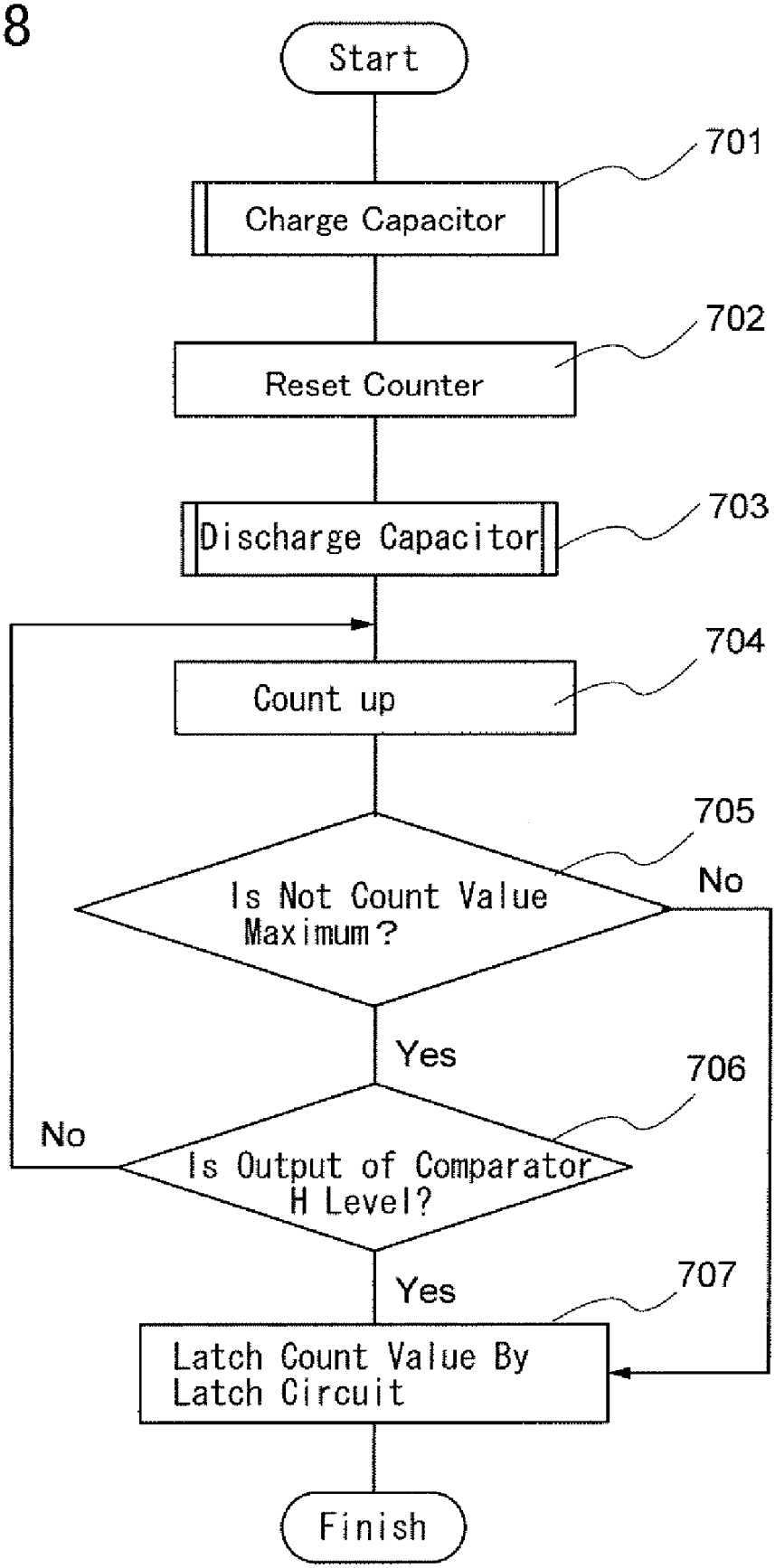
FIG. 8 is a flowchart illustrating Embodiment 1.

A specific operation of the digital output type photoelectric conversion device 400 which is described in FIG. 6 and FIGS. 7A and 7B is described with reference to a flow chart illustrated in FIG. 8.

First, in the photoelectric conversion device 400, electric charge starts to be charged into the capacitor 105 (the capacitor 105 starts to be reset) (Step 701). The capacitor 105 is charged with electric charge in such a manner that the first switch 103 is turned on and the second switch 104 is turned off, so that a wiring to which the first potential Vset is supplied is electrically connected to the capacitor 105 as described above. Moreover, in Step 701, the clock signal is output from the clock generation circuit 405 at the same time as charging of the capacitor 105.

Next, in the photoelectric conversion device 400, after the capacitor 105 is charged with electric charge, the count value of the counter circuit 404 is reset (Step 702). Further, in Step 702, the count value held in the latch circuit 403 is initialized at the same time as reset of the count value of the counter circuit 404.

Next, in the photoelectric conversion device 400, electric charge stored in the capacitor 105 is discharged by the second n-channel transistor 1 08 in the photoelectric conversion circuit 109 (Step 703). Electric charge is discharged from the capacitor 105 in such a manner that the first switch 103 is turned off and the second switch 104 is turned on, so that the capacitor 105 is electrically connected to a first terminal of the second n-channel transistor 108 as described above. Note that discharge of electric charge which is stored in the capacitor 105 may start at the same time as reset of the counter circuit 404, which is performed in Step 702.

Then, the counter circuit 404 counts up the count value in accordance with output of the clock signal from the clock generation circuit 405 (Step 704).

Next, whether the count value which is counted up reaches the maximum value is determined (Step 705). In Step 705, when the count value does not reach the maximum value, whether the output signal Vout which is output from the comparator 106 to the latch circuit 403 is at the H level is determined (Step 706). In Step 706, when the count value does not reach the maximum value and the output from the comparator 106 is not at the H level, the count value is counted up again in Step 704. In Step 705, when the count value reaches the maximum value, and when the count value does not reach the maximum value and the output from the comparator 106 is at the H level, the count value is held (latched) by the latch circuit 403 (Step 707). Through the above operations, light intensity is detected by the photoelectric conversion device based on the count value which is latched by the latch circuit. In this embodiment, the light intensity is higher as the count value is smaller, and the light intensity is lower as the count value is larger. Note that when the count value is the maximum value, light is not detected, so that the light intensity is also "0".

Figure 9:
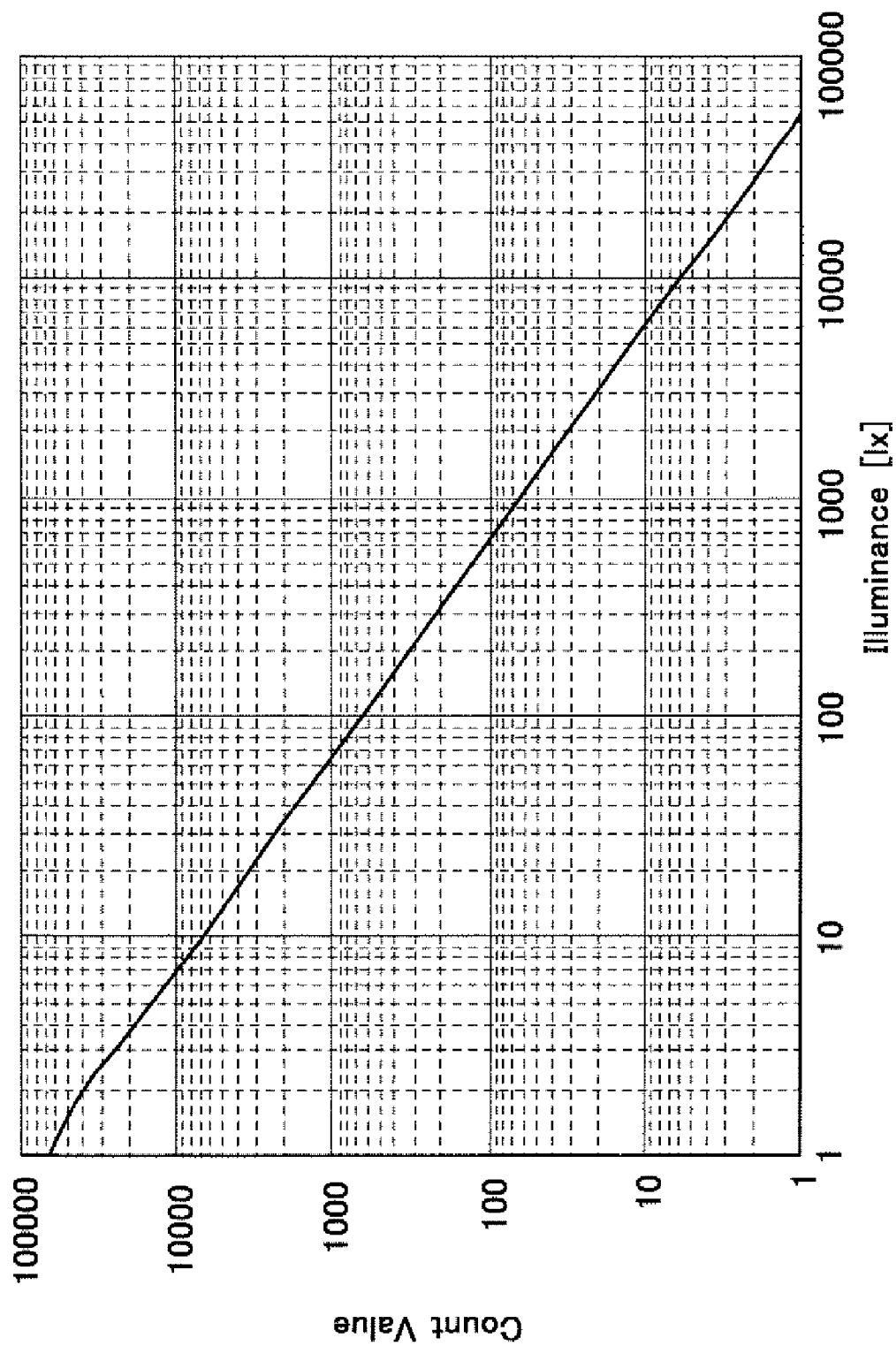
FIG. 9 is a graph illustrating Embodiment 1.

FIG. 9 is a graph illustrating change of the count value with respect to change of incident light intensity to the photoelectric conversion element. Here, light intensity is represented by illuminance. As illustrated in FIG. 9, the photoelectric conversion device described in this embodiment detects illuminance by utilizing the count value which varies depending on the amount of the photocurrent. In particular, according to this embodiment, even when the illuminance of light with which the photoelectric conversion element is irradiated is low so that the amount of the flowing photocurrent is small, a space between count values which correspond to the light illuminance of the count value can be increased and light can be detected with high accuracy.

As described above, the photoelectric conversion device has a structure in which the capacitor is charged regardless of the amount of incident light to the photoelectric conversion element. Accordingly, even when the amount of incident light is small, electric charge is accumulated in the capacitor and light intensity can be detected. Further, the photoelectric conversion device can have a structure in which electric charge accumulated in the capacitor is discharged by the photoelectric conversion circuit Accordingly, light intensity can be detected without additionally providing an element such as a constant current source or a switch.

Note that what is illustrated in the drawing can be freely combined with or replaced with what is described in other embodiments as appropriate.

Embodiment 2

In Embodiment 1, the n-channel transistor is described as an example of the transistor of the amplifier circuit 102 in the photoelectric conversion circuit 109; in this embodiment, a structure employing a p-channel transistor is described. Note that in this embodiment, the portions described in Embodiment 1 are denoted by the same reference numerals, and the description is not repeated.

Figure 10:
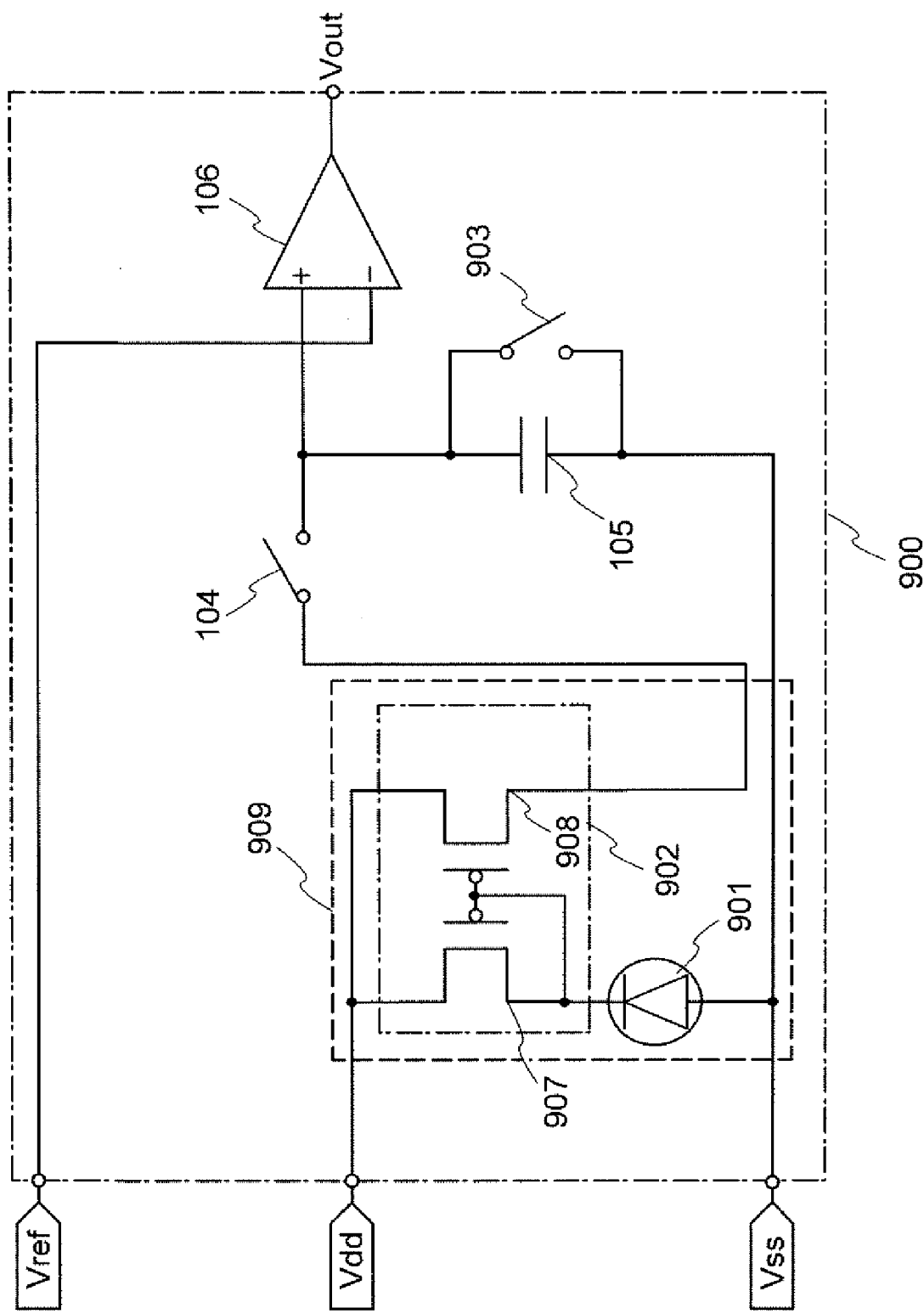
FIG. 10 is a circuit diagram illustrating Embodiment 2.

First, a circuit diagram of a photoelectric conversion device in this embodiment is described. A photoelectric conversion device 900 illustrated in FIG. 10 includes a photoelectric conversion element 901, an amplifier circuit 902, a first switch 903, the second switch 104, the capacitor 105, and the comparator 106. One terminal (the n-type semiconductor side) of the photoelectric conversion element 901 is electrically connected to an output terminal of the amplifier circuit 902, and the other terminal (the p-type semiconductor side) is electrically connected to the low power supply potential Vss. As illustrated in FIG. 10, the amplifier circuit 902 is constituted by a current mirror circuit which has a first p-channel transistor 907 and a second p-channel transistor 908. Gate terminals of the first p-channel transistor 907 and the second p-channel transistor 908 are electrically connected to each other, and a first terminal of the first p-channel transistor 907 is electrically connected to the gate terminals of the first p-channel transistor 907 and the second p-channel transistor 908. The high power supply potential Vdd is supplied to second terminals of the first p-channel transistor 907 and the second p-channel transistor 908. Note that the photoelectric conversion element 901 and the amplifier circuit 902 including the first p-channel transistor 907 and the second p-channel transistor 908 may be collectively referred to as a photoelectric conversion circuit 909. Further, a first terminal of the first switch 903 is electrically connected to one electrode of the capacitor 105, a first terminal of the second switch 104, and the non-inverting input terminal of the comparator 106, and a second terminal of the first switch 903 is electrically connected to the other electrode of the capacitor 105. The low power supply potential Vss is supplied to the other electrode of the capacitor 105. The second terminal of the second switch 104 is electrically connected to a first terminal of the second p-channel transistor 908. The reference potential Vref is supplied to the inverting input terminal of the comparator 106, and an output signal is output from the output terminal of the comparator 106.

Note that in the amplifier circuit 902 of the photoelectric conversion circuit 909, a plurality of second p-channel transistors 908 may be electrically connected in parallel. By providing the plurality of second p-channel transistors 908, current which flows between the source and the drain of the first p-channel transistor 907 when the photoelectric conversion element 901 is irradiated with light can be amplified to flow. Therefore, even when the amount of incident light to the photoelectric conversion element 901 is small, enough current to obtain an output signal can flow into the second p-channel transistor 908.

Note that the capacitor 105 is discharged by the low power supply potential Vss when the first switch 903 is turned on, and then, is charged depending on the current flow into the photoelectric conversion circuit 909 when the second switch 104 is turned on. Therefore, the capacitor 105 preferably has such a capacitance that a potential can be increased by storing electric charge in consideration of the time for storing the electric charge into the second p-channel transistor 908 in the amplifier circuit 902.

The reference potential Vref supplied to the inverting input terminal of the comparator 106 is a potential to be compared with the potential of one electrode of the capacitor 105 in the case where the capacitor 105 is discharged with the low power supply potential Vss when the first switch 903 is turned on, and then is charged by the amplifier circuit 902. The reference potential Vref is used as an output signal Vout output from the output terminal. The second potential Vref is preferably set to be smaller than the high power supply potential Vdd and larger than the low power supply potential Vss. As the output signal Vout, an H level signal or an L level signal is output.

Next, a structure which includes a block diagram of a structure for generating a signal for converting an analog signal into a digital signal in addition to a circuit diagram described in FIG. 10 is described with reference to FIG. 10. A digital output type photoelectric conversion device 1000 illustrated in FIG. 11 includes the constant voltage circuit 401 (also referred to as the regulator), the control circuit 402, the latch circuit 403, the counter circuit 404, the clock generation circuit 405, and the interface circuit 406 in addition to the photoelectric conversion device 900 illustrated in FIG. 10. The description of the constant voltage circuit 401, the control circuit 402, the latch circuit 403, the counter circuit 404, the clock generation circuit 405, and the interface circuit 406 is similar to the description in Embodiment 1.

Figure 11:
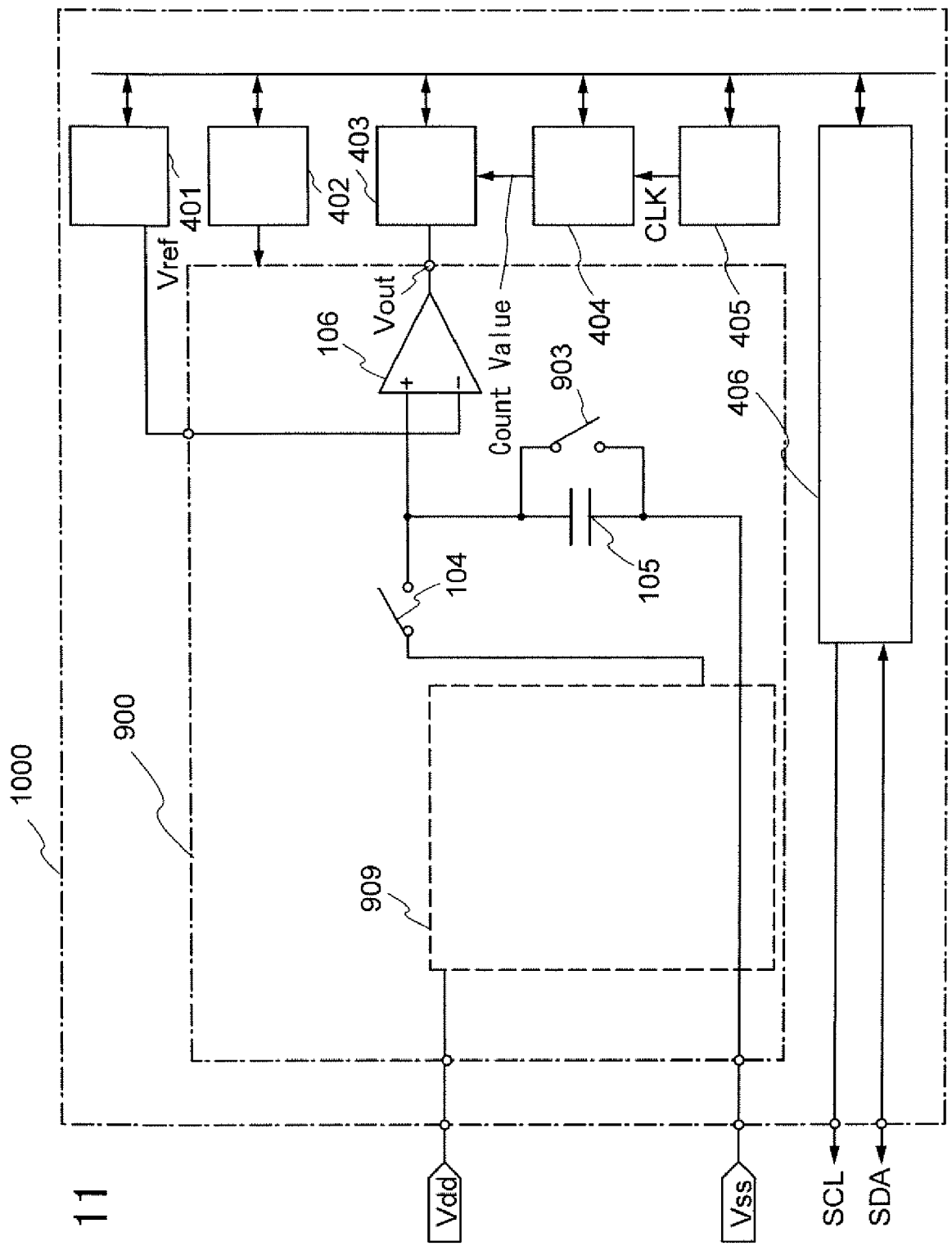
FIG. 11 is a circuit diagram illustrating Embodiment 2.
Figure 12:
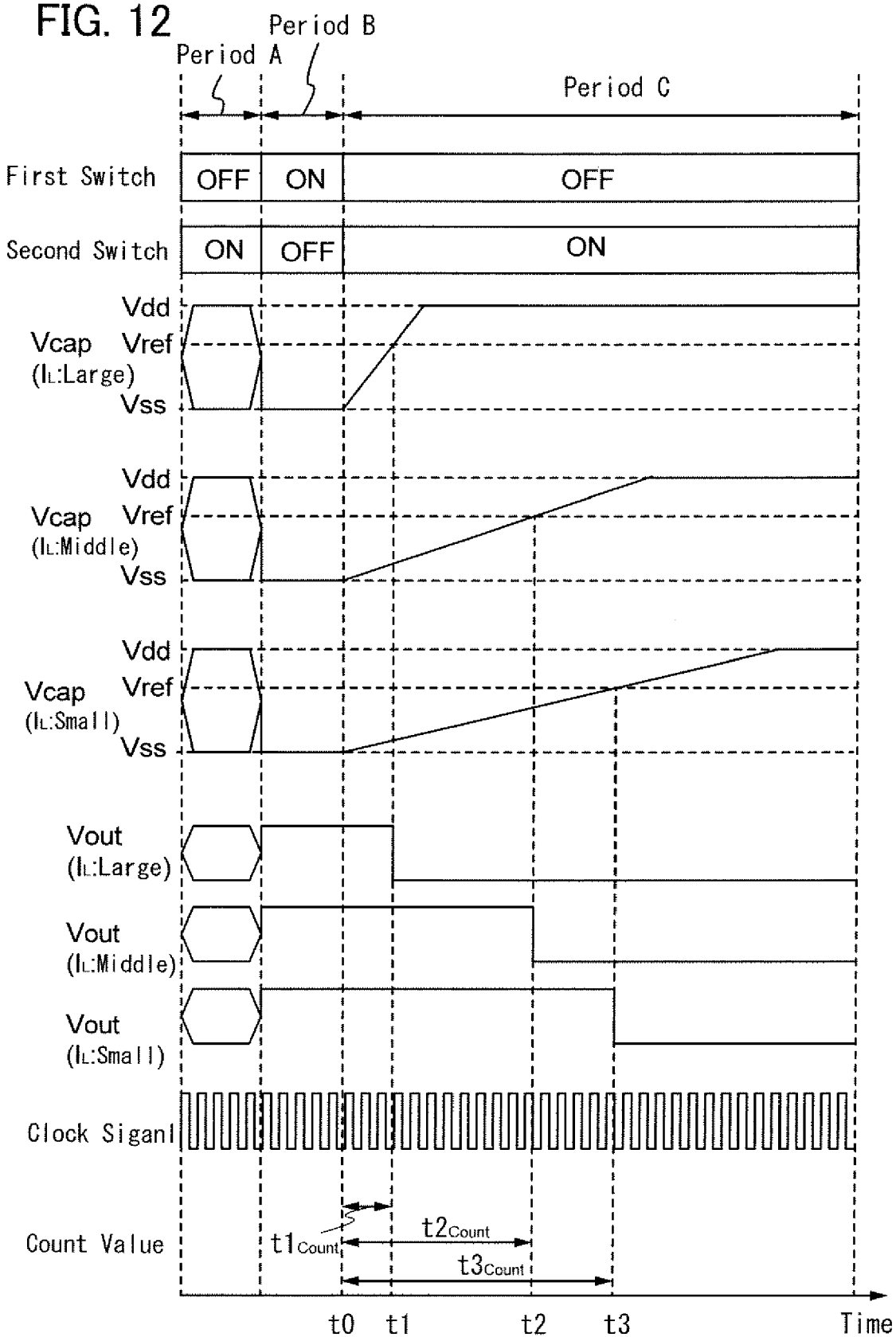
FIG. 12 is a timing chart illustrating Embodiment 2.

Next, a specific operation of the digital output type photoelectric conversion device 900 illustrated in FIG. 11 is described with reference to FIG. 12 and FIGS. 13A and 13B. FIG. 12 is a timing chart illustrating the potential Vcap of one electrode of the capacitor 105 when on and off of the first switch 903 and the second switch 104 are switched, the potential Vout of the output signal of the comparator 106, a clock signal, and a count value. Note that in the following description of Vcap and Vout, the amount of current It generated when the photoelectric conversion element 101 is irradiated with light is classified into three levels of large, middle, and small.

First, a period A in which the first switch 903 is off and the second switch 104 is on illustrated in FIG. 10 is described. In the period A, the potential Vcap of one electrode of the capacitor 105 continues to be changed in accordance with the amount of photocurrent 1i and is not fixed. Further, in the period A, the potential Vout of the output signal of the comparator 106 continues to be changed in accordance with the potential of Vcap and is not fixed. Note that the clock signal is output from the clock generation circuit 405 to the counter circuit 404 in the period A. Accordingly, in the counter circuit 404, the count value is counted up, but is not held in the latch circuit 403 in the period A.

Next, a period B in which the first switch 903 is on and the second switch 104 is off is described. In the period B, the potential Vcap of one electrode of the capacitor 105 is set to the Tow power supply potential Vss regardless of the amount of photocurrent $I_L$. Further, in the period B, as the potential Vout of the output signal of the comparator 106, the H level of signal is output regardless of the amount of photocurrent $I_L$ because the low power supply potential Vss is lower than the reference potential Vref.

FIG. 13A schematically illustrates on or off of each switch and the flow of electric charge in the period B. The first switch 903 is turned on, whereby the low power supply potential Vss is supplied to the capacitor 105 and the capacitor 105 is discharged. Since the second switch 104 is off, electric charge is not transferred from the second p-channel transistor 908 to the capacitor 105.

Next, a period C in which the first switch 903 is off and the second switch 104 is on is described. First, in the period C, in the case where the amount of photocurrent $I_L$ is large when the photoelectric conversion element 901 is irradiated with light ($I_L$: large in FIG. 12), the amount of current I which flows from the second p-channel transistor 908 increases in accordance with the photocurrent $I_L$, so that the potential Vcap of one electrode of the capacitor 105 increases. Accordingly, the potential Vcap of the capacitor 105, which is Vss at the time $t_0$ (time $t_0$<time $t_1$<time $t_2$<time $t_3$), becomes the potential Vref at the time $t_1$, and then becomes the potential Vdd when charging to the capacitor 105 is finished. At this time, as the potential Vout of the output signal of the comparator 106, the H level signal is output when the potential Vcap of the capacitor is changed from the low power supply potential Vss to the reference potential Vref. Then, the input count value is held in the latch circuit 403 by the signal. Note that the counter circuit 404 and the latch circuit 403 are reset at the same time as the time $t_0$ when the period C starts, and the counter circuit 404 counts up based on the clock signal. Then, the potential Vout of the output signal of the comparator 106 is input to the latch circuit 403 at the time $t_1$, so that a count value $t1_{count}$ based on the clock signal in the period from the time $t_0$ to the time $t_1$ can be obtained.

In the period C in which the first switch 903 is off and the second switch 104 is on, in the case where the amount of photocurrent $I_L$ is middle when the photoelectric conversion element 901 is irradiated with light ($I_L$: middle in FIG. 12), the amount of current I which flows into the second p-channel transistor 908 is smaller than that in the case where the amount of photocurrent $I_L$ is larger. Thus, although the rate of decrease is low, the potential Vcap of one electrode of the capacitor 105 increases. Accordingly, the potential Vcap of the capacitor 105, which is Vss at the time $t_0$, becomes the potential Vref at the time $t_2$, and then becomes the potential Vdd when charging to the capacitor 105 is finished. At this time, as the potential Vout of the output signal of the comparator 106, the H level signal is output when the potential Vcap of the capacitor is changed from the low power supply potential Vss to the reference potential Vref Then, the input count value is held in the latch circuit 403 by the signal. Note that the counter circuit 404 and the latch circuit 403 are reset at the same time as the time $t_0$ when the period C starts, and the counter circuit 404 counts up based on the clock signal. Then, the potential Vout of the output signal of the comparator 106 is input to the latch circuit 403 at the time $t_2$, so that a count value $t2_{count}$ based on the clock signal in the period from the time $t_0$ to the time $t_2$ can be obtained.

In the period C in which the first switch 903 is off and the second switch 104 is on, in the case where the amount of photocurrent $I_L$ is small when the photoelectric conversion element 901 is irradiated with light ($I_L$: small in FIG. 12), the amount of current I which flows into the second p-channel transistor 908 is smaller because the amount of photocurrent $I_L$ is smaller, whereby the potential Vcap of one electrode of the capacitor 105 decreases although the rate of decrease is low. Accordingly, the potential Vcap of the capacitor 105, which is Vss at the time $t_0$, becomes the potential Vref at the time $t_3$, and then becomes the potential Vdd when charging to the capacitor 105 is finished. At this time, as the potential Vout of the output signal of the comparator 106, the L level signal is output when the potential Vcap of the capacitor is changed from the low power supply potential Vss to the reference potential Vref. Then, the input count value is held in the latch circuit 403 by the signal. Note that the counter circuit 404 and the latch circuit 403 are reset at the same time as the time $t_0$ when the period C starts, and the counter circuit 404 counts up based on the clock signal. Then, the potential Vout of the output signal of the comparator 106 is input to the latch circuit 403 at the time $t_3$, so that a count value $t3_{count}$ based on the clock signal in the period from the time $t_0$ to the time $t_3$ can be obtained.

FIG. 13B schematically illustrates on or off of each switch and the flow of electric charge in the period C. Since the first switch 903 is turned off, the capacitor 105 is not additionally discharged with the low power supply potential Vss. On the other hand, since the second switch 104 is turned on, the current I flows from the second p-channel transistor 908 to the capacitor 105, whereby the capacitor 105 is charged. Note that since the amplifier circuit 902 forms a current mirror circuit, the amount of current I which flows into the second p-channel transistor 908 is proportional to the amount of photocurrent $I_L$.

Note that in the period C in which the first switch 903 is off and the second switch 104 is on, in the case where the photocurrent $I_L$ is not detected because the photoelectric conversion element 901 is not irradiated with light, the current I which flows into the second p-channel transistor 908 is not generated, whereby the potential Vcap of one electrode of the capacitor 105 hardly increases. Therefore, the potential Vcap of the capacitor 105 is Vss at the time $t_0$ and is not changed to the potential Vref over time. At this time, since the potential Vcap of the capacitor is not changed from the low power supply potential Vss to the reference potential Vref, the H level signal is continuously output as the potential Vout of the output signal of the comparator 106. The clock signal is output to the counter circuit 404 from the time $t_0$ when the period C starts. Accordingly, the above count value in accordance with the photocurrent $I_L$ cannot be obtained, and the count value reaches the maximum value of the counter circuit. In this case, the maximum value of the count value is preferably output to the latch circuit.

Figure 14:
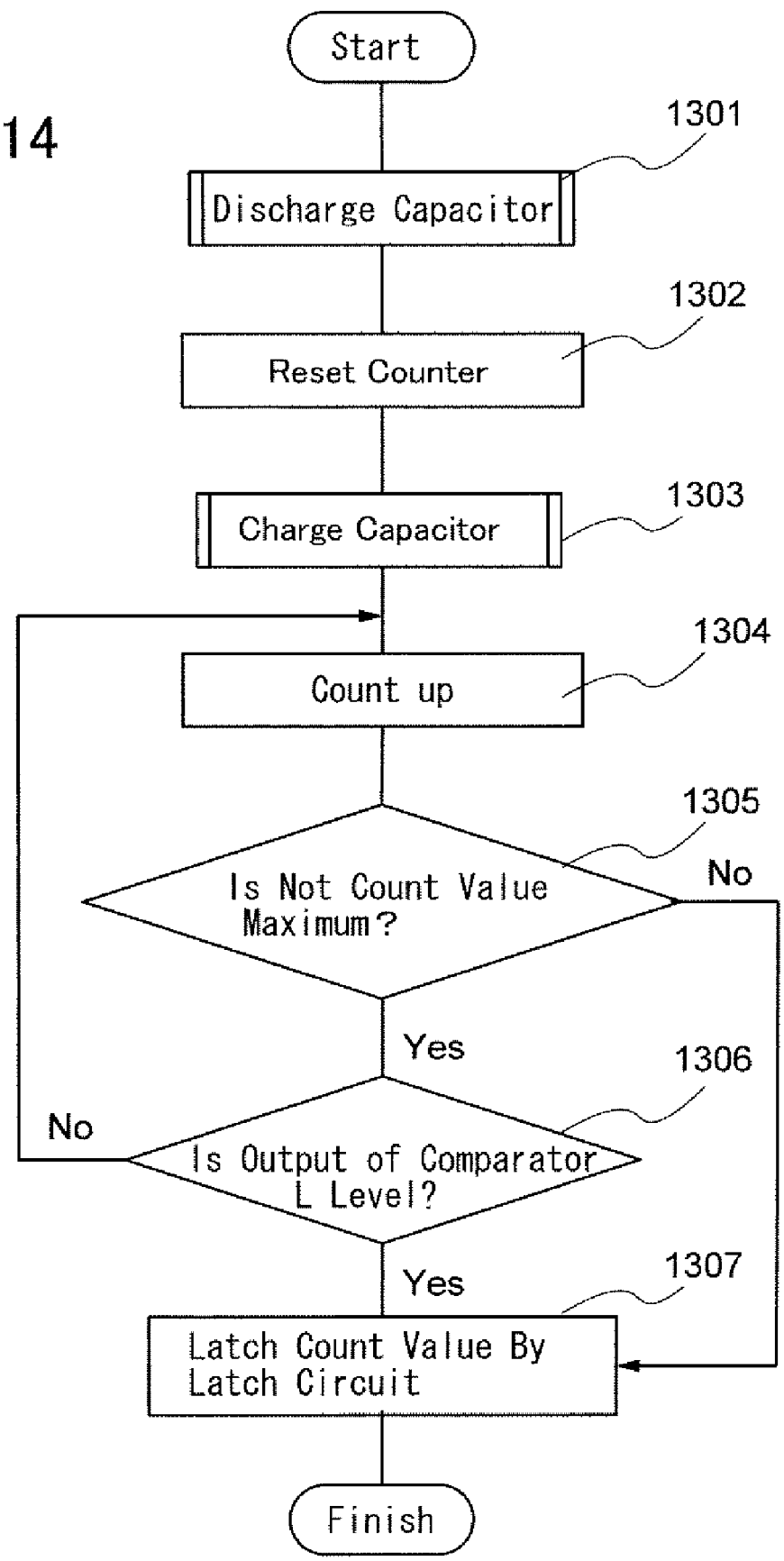
FIG. 14 is a flowchart illustrating Embodiment 2.

A specific operation of the digital output type photoelectric conversion device 1000 which is described in FIG. 12 and FIGS. 13A and 13B is described with reference to a flow chart illustrated in FIG. 14.

First, in the photoelectric conversion device 1 000, electric charge of the capacitor 105 starts to be discharged (reset) (Step 1301). The electric charge in the capacitor 105 is discharged in such a manner that the first switch 903 is turned on and the second switch 104 is turned off, so that the opposite electrodes of the capacitor 105 are electrically connected to each other through a wiring to which the low power supply potential Vss is supplied as described above. Further, in Step 1301, the clock signal is output from the clock generation circuit 405 at the same time as discharge of the capacitor 105.

Next, in the photoelectric conversion device 1000, after electric charge in the capacitor 105 is discharged, the count value of the counter circuit 404 is reset (Step 1302). Further, in Step 1302, the count value held in the latch circuit 403 is initialized at the same time as reset of the count value of the counter circuit 404.

Then, in the photoelectric conversion device 1000, the capacitor 1 05 which has been discharged is charged with electric charge by the second p-channel transistor 908 in the photoelectric conversion circuit 909 (Step 1303). The capacitor I 05 is charged with electric charge in such a manner that the first switch 903 is turned off and the second switch 104 is turned on, so that the capacitor 105 is electrically connected to the first terminal of the second p-channel transistor 908 as described above. Note that charging of electric charge to the capacitor 105 may start at the same time as reset of the counter circuit 404, which is performed in Step 1302.

Next, the counter circuit 404 counts up the count value in accordance with output of the clock signal from the clock generation circuit 405 (Step 1304).

Then, whether the count value which is counted up reaches maximum value is determined (Step 1305). In Step 1305, when the count value does not reach the maximum value, whether the output signal Vout which is output from the comparator 106 to the latch circuit 403 is at the L level is determined (Step 1306). In Step 1306, when the count value does not reach the maximum value and the output from the comparator 106 is not at the L level, the count value is counted up again in Step 1304. In Step 1305, when the count value reaches the maximum value, and when the count value does not reach the maximum value and the output from the comparator 106 is at the L level, the count value is held by the latch circuit 403 (Step 1307). Through the above operations, light intensity is detected by the photoelectric conversion device based on the count value which is latched by the latch circuit. In this embodiment, the light intensity is higher as the count value is smaller, and the light intensity is lower as the count value is larger. Note that when the count value is the maximum value, light is not detected, so that the light intensity is also "0".

As described above, the photoelectric conversion device has a structure in which the capacitor is charged regardless of the amount of the incident light to the photoelectric conversion element as in Embodiment 1. Accordingly, even when the amount of incident light is small, electric charge is accumulated in the capacitor and light intensity can be detected. Further, the photoelectric conversion device can have a structure in which electric charge which is reset in the capacitor can be charged by the photoelectric conversion circuit through which the current that is proportional to the amount of incident light can flow. Accordingly, light intensity can be detected without additionally providing an element such as a constant current source or a switch. Further, in the structure described in this embodiment, it is not necessary to supply the first potential Vset to the photoelectric conversion device; thus, the number of wirings can be reduced, and the photoelectric conversion device can be miniaturized.

Note that what is illustrated in the drawing can be freely combined with or replaced with what is described in other embodiments as appropriate.

Embodiment 3

In this embodiment, a method for manufacturing a photoelectric conversion device is described in detail with reference to FIGS. 15A to 15D and FIGS. 16A to 16C.

Note that in this embodiment, an example of the photoelectric conversion device is described, which is provided with a thin film transistor (TFT) which is an element included in each circuit in the photoelectric conversion device, and a vertical-junction PIN photodiode (hereinafter also referred to as a photodiode) which is a photoelectric conversion element. Note that as the photoelectric conversion device, as well as a TFT and a PIN photodiode, a memory element, a resistor, a diode, a capacitor, an inductor, or the like can also be used. Further, as the photoelectric conversion device, a vertical-junction type PN photodiode may also be used instead of the vertical-junction type PIN photodiode.

First, a photodiode and a thin film transistor are formed over a light-transmitting substrate 1401. As the substrate 1401, a glass substrate of barium borosilicate glass, aluminum borosilicate glass, or the like; a quartz substrate; or the like can be used, for example. A thin film transistor is used as a transistor formed over the substrate so that a photodiode and a thin film transistor can be formed on the substrate in the same process; therefore, there is an advantage that the photoelectric conversion device is easy to be produced in large quantities.

Next, a silicon oxynitride film (with a thickness of 100 nm) to be a base insulating film 1402 is formed by a plasma CVD method, and a semiconductor film such as an amorphous silicon film (with a thickness of 54 nm) containing hydrogen is stacked thereover without being exposed to the atmosphere. Moreover, the base insulating film 1402 may be formed by stacking a silicon oxide film, a silicon nitride film, a silicon oxynitride film, and/or a silicon nitride oxide film. For example, a film in which a silicon nitride oxide film with a thickness of 50 nm and a silicon oxynitride film with a thickness of 100 nm are stacked may be formed as the base insulating film 1402. Note that the silicon nitride oxide film and the silicon nitride film serve as a blocking layer that prevents diffusion of impurities such as an alkali metal from the glass substrate. Note that the insulating film is not necessarily provided when a substrate such as a quartz substrate is used so that the diffusion of impurities does not lead to any significant problem.

Note that a silicon oxynitride film means a film that contains more oxygen than nitrogen and, in the case where measurements are performed using Rutherford backscattering spectrometry (RBS) and hydrogen forward scattering (HFS), includes oxygen, nitrogen, silicon, and hydrogen at concentrations ranging from 50 at. % to 70 at. %, 0.5 at. % to 15 at. %, 25 at. % to 35 at. %, and 0.1 at. % to 10 at. %, respectively. Further, a silicon nitride oxide film means a film that contains more nitrogen than oxygen and, in the case where measurements are performed using RBS and HFS, includes oxygen, nitrogen, silicon, and hydrogen at concentrations ranging from 5 at. % to 30 at. %, 20 at. % to 55 at. %, 25 at. % to 35 at. %, and 10 at. % to 25 at. %, respectively. Note that percentages of nitrogen, oxygen, silicon, and hydrogen fall within the ranges given above, where the total number of atoms contained in the silicon oxynitride film or the silicon nitride oxide film is defined as 100 at. %.

Then, the amorphous silicon film is crystallized by a know technique (e.g., a solid-phase growth method, a laser crystallization method, or a crystallization method using a catalytic metal) to form a semiconductor film (a crystalline semiconductor film) having a crystalline structure, for example, a polycrystalline silicon film. Here, a polycrystalline silicon film is obtained by a crystallization method using a catalytic element, A nickel acetate solution containing nickel of 10 ppm by weight is added by a spinner. Note that a nickel element may be dispersed over the entire surface by a sputtering method instead of a method of adding the solution. Then, heat treatment is performed for crystallization to form a semiconductor film (here, a polycrystalline silicon film) having a crystalline structure. Here, a polycrystalline silicon film is obtained by heat treatment for crystallization (at 550° C. for 4 hours) after the heat treatment (at 500° C. for 1 hour).

Next, an oxide film on the surface of the polycrystalline silicon film is removed by a dilute hydrofluoric acid or the like. After that, in order to increase a crystallization rate and repair defects left in crystal grains, irradiation with laser light (XeCl: a wavelength of 308 nm) is performed in the atmosphere or an oxygen atmosphere.

As the laser light, excimer laser light with a wavelength of 400 nm or less; or a second harmonic or a third harmonic of a YAG laser is used. Here, pulsed laser light with a repetition rate of approximately 10 Hz to 1000 Hz is used, the pulsed laser light is condensed to 100 mJ/cm$^2$ to 500 mJ/cm$^2$ by an optical system, and irradiation is performed with an overlap rate of 90% to 95%, whereby the surface of the silicon film may be scanned. In this embodiment, irradiation with laser light having a repetition rate of 30 Hz and an energy density of 470 mJ/cm$^2$ is performed in the atmosphere.

Note that since laser light irradiation is performed in the atmosphere or an oxygen atmosphere, an oxide film is formed on the surface by the laser light irradiation. In addition, although an example in which the pulsed laser is used is shown in this embodiment, a continuous wave laser may be used instead. In order to obtain crystal with a large grain size at the time of crystallization of a semiconductor film, it is preferable to use a solid laser which is capable of continuous oscillation and to apply the second to fourth harmonic of a fundamental wave. Typically, a second harmonic (532 nm) or a third harmonic (355 nm) of an Nd:YVO$_4$ laser (a fundamental wave of 1064 nm) may be used.

In the case of using a continuous wave laser, laser light which is emitted from a continuous wave YVO$_4$ laser of 10W output is converted into a harmonic by a non-linear optical element. Alternatively, there is a method by which YVO$_4$ crystal and a non-linear optical element are put in a resonator and a high harmonic is emitted. Then, the laser light having a rectangular shape or an elliptical shape on an irradiated surface is preferably formed by an optical system and emitted to an object to be processed. At this time, a power density of approximately 0.01 MW/cm$^2$ to 100 MW/cm$^2$ (preferably 0.1 MW/cm$^2$ to 10 MW/cm$^2$) is necessary. Then, the semiconductor film may be moved at a rate of approximately 10 cm/s to 2000 cm/s relatively to the laser light so as to be irradiated.

Next, in addition to the oxide film which is formed by the above laser light irradiation, a barrier layer formed of an oxide film having a thickness of 1 nm to 5 nm in total is formed by treatment to the surface with ozone water for 120 seconds. The barrier layer is formed in order to remove the catalytic element which is added for crystallization, for example, nickel (Ni), from the film. Although the barrier layer is formed using ozone water here, the barrier layer may be formed by deposition of an oxide film having a thickness of approximately 1 nm to 10 nm by a method of oxidizing a surface of the semiconductor film having a crystalline structure by UV-ray irradiation in an oxygen atmosphere or by oxygen plasma treatment; a plasma CVD method; a sputtering method; an evaporation method; or the like. Further, the oxide film formed by the laser light irradiation may be removed before the barrier layer is formed.

Then, an amorphous silicon film containing argon which serves as a gettering site is formed to a thickness of 10 nm to 400 nm, here 100 nm, over the barrier layer by a sputtering method. Here, the amorphous silicon film containing argon is formed using a silicon target in an atmosphere containing argon. When an amorphous silicon film containing argon is formed by a plasma CVD method, deposition conditions are as follows: a flow ratio of monosilane to argon ($SiH_4$:Ar) is 1:99, the deposition pressure is set to be 6.665 Pa, the RF power density is set to be 0.087 W/cm$^2$, and the deposition temperature is set to be 350° C.

After that, heat treatment in a furnace heated at 650° C. is performed for 3 minutes to remove a catalytic element (gettering). Accordingly, concentration of the catalytic element in the semiconductor film having a crystalline structure is reduced. A lamp annealing apparatus may be used instead of the furnace.

Next, the amorphous silicon film containing argon, which is a gettering site, is selectively removed using the barrier layer as an etching stopper, and after that the barrier layer is removed with a diluted hydrofluoric acid as selected. Note that nickel has a tendency to move to a region having high oxygen concentration at the time of gettering; therefore, it is preferable to remove the barrier layer formed of an oxide film after gettering.

Note that when the semiconductor film is not crystallized using a catalytic element, the above steps such as formation of the barrier layer, formation of the gettering site, heat treatment for gettering, removal of the gettering site, and removal of the barrier layer are not necessary.

Then, a thin oxide film is formed on the surface of the obtained semiconductor film (e.g., crystalline silicon film) having a crystalline structure with ozone water. After that, a resist mask is formed using a first photomask, and the semiconductor film is etched into a desired shape to form a semiconductor film (in this specification, referred to as an island-shaped semiconductor region 1403) which is separated into an island shape (see FIG. 15A). After the island-shaped semiconductor regions are formed, the resist mask is removed.

Next, a very small amount of an impurity element (boron or phosphorus) is added in order to control the threshold value of the TFT, if necessary. Here, an ion doping method is used, in which diborane ($B_2H_6$) is not separated by mass but excited by plasma.

Then, the oxide film is removed with an etchant containing a hydrofluoric acid, and at the same time, the surface of the island-shaped semiconductor region 1403 is washed. After that, an insulating film containing silicon as its main component, which serves as a gate insulating film 1404, is formed. Here, a silicon oxide film containing nitrogen (the composition ratio. Si=32%, O=59%, N=7%, and H=2%) is formed to a thickness of 115 nm by a plasma CVD method.

Figure 15A:
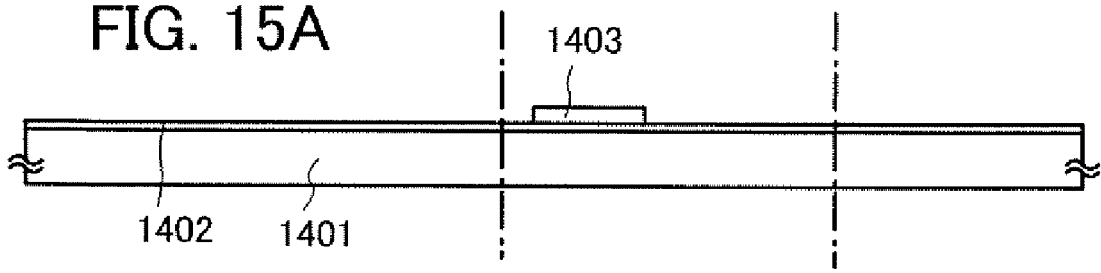
FIGS. 15A to 15D are cross-sectional views illustrating Embodiment 3.
Figure 15B:
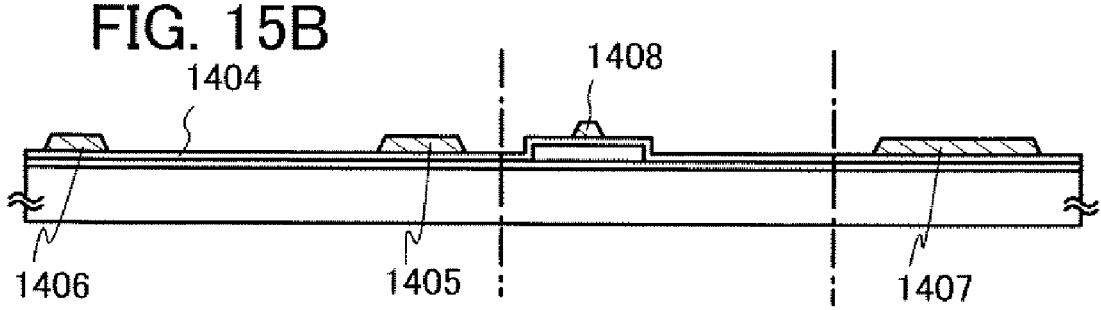

Next, after a metal film is formed over the gate insulating film 1404, a gate electrode 1408, wirings 1405 and 1406, and a terminal electrode 1407 are formed using a second photomask (see FIG. 15B). As the metal film, a film in which tantalum nitride and tungsten (W) are stacked to be 30 nm and 370 nm respectively is used, for example.

Alternatively, as the gate electrode 1408, the wirings 1405 and 1406, and the terminal electrode 1407, instead of the above film, a single layer formed of an element selected from titanium (Ti), tungsten (W), tantalum (Ta), molybdenum (Mo), neodymium (Nd), cobalt (Co), zirconium (Zr), zinc (Zn), ruthenium (Ru), rhodium (Rh), palladium (Pd), osmium (Os), iridium (Ir), platinum (Pt), aluminum (Al), gold (Au), silver (Ag), and copper (Cu), or an alloy material or a compound material containing the above element as its main component: or a single layer formed of nitride of the above element, for example, titanium nitride, tungsten nitride, tantalum nitride, or molybdenum nitride may be used.

Figure 15C:
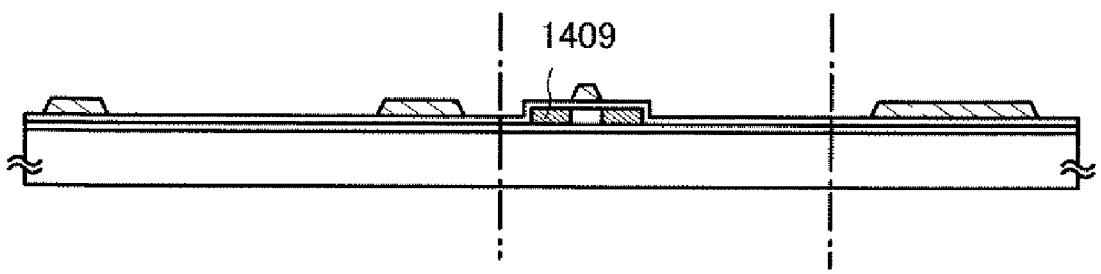

Then, an impurity element imparting one conductivity type is introduced into the island-shaped semiconductor region 1403 to form a source region and a drain region 1409 of a TFT 1500 (see FIG. 15C). In this embodiment, an n-channel TFT is formed as an example; therefore, an impurity element imparting n-type conductivity, such as phosphorus (P) or arsenic (As), is introduced into the island-shaped semiconductor region 1403. When a p-channel TFT is formed, a p-type impurity is introduced into the island-shaped semiconductor region 1403.

Next, a first interlayer insulating film (not shown) including a silicon oxide film is formed to be 50 nm thick by a CVD method, and after that, a step for activating the impurity element added to each island-shaped semiconductor region is performed. This activation process is performed by a rapid thermal annealing method (RTA method) using a lamp light source; an irradiation method with a YAG laser or an excimer laser from the back side; heat treatment using a furnace; or a method which is a combination of any of the foregoing methods.

Then, a second interlayer insulating film 1410 including a silicon nitride film containing hydrogen and oxygen is formed, for example, to be 10 nm thick.

Figure 15D:
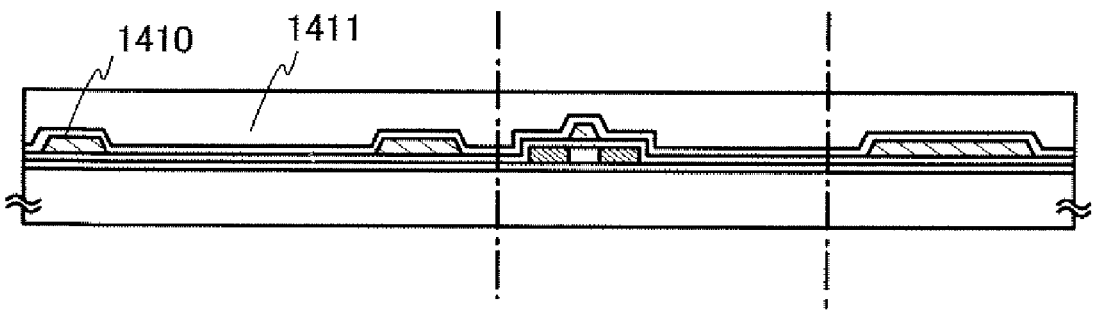

Next, a third interlayer insulating film 1411 formed of an insulating material is formed over the second interlayer insulating film 1410 (see FIG. 15D). An insulating film obtained by a CVD method can be used as the third interlayer insulating film 1411. In this embodiment, in order to improve adhesion, a silicon oxide film containing nitrogen is formed to be 900 nm thick as the third interlayer insulating film 1411.

Then, heat treatment (heat treatment at 300° C. to 550° C. for 1 to 12 hours, for example, at 410° C. for 1 hour in a nitrogen atmosphere) is performed to hydrogenate the island-shaped semiconductor region 1403. This step is performed to terminate a dangling bond in the island-shaped semiconductor film by hydrogen contained in the second interlayer insulating film 1410. The island-shaped semiconductor film can be hydrogenated regardless of whether the gate insulating film 1404 is formed.

Alternatively, as the third interlayer insulating film 1411, an insulating film using siloxane or a stacked structure thereof can be used. Siloxane has a skeleton structure of a bond of silicon (Si) and oxygen (O). A compound containing at least hydrogen (e.g., an alkyl group or aromatic hydrocarbon) is used as a substituent. Alternatively, fluorine; or fluorine and a compound containing at least hydrogen may be used as a substituent.

When an insulating film using siloxane or a stacked structure thereof is used for the third interlayer insulating film 1411, after formation of the second interlayer insulating film 1410, heat treatment for hydrogenating the island-shaped semiconductor film can be performed, and then, the third interlayer insulating film 1411 can be formed.

Next, a resist mask is formed using a third photomask, and the first interlayer insulating film, the second interlayer insulating film 1410, and the third interlayer insulating film 1411, or the gate insulating film 1404 are selectively etched to form a contact hole. Then, the resist mask is removed.

Note that the third interlayer insulating film 1411 may be formed if necessary. When the third interlayer insulating film 1411 is not formed, after the second insulating film 1410 is formed, the first interlayer insulating film, the second interlayer insulating film 1410, and the gate insulating film 1404 are selectively etched to form a contact hole.

Next, after a metal stacked film is formed by a sputtering method, a resist mask is formed using a fourth photomask, and then, the stacked metal film is selectively etched to form a wiring 1412, a connection electrode 1413, a terminal electrode 1414, and a source/drain electrode 1415 of the TFT 1500. Then, the resist mask is removed. Note that the metal film of this embodiment is a stacked layer of three films: a Ti film with a thickness of 100 nm, an Al film containing a very small amount of Si with a thickness of 350 nm, and a Ti film with a thickness of 100 nm.

Alternatively, when each of the wiring 1412, the connection electrode 1413, the terminal electrode 1414, and the source/drain electrode 1415 of the TFT 4500 is formed of a single conductive film, a titanium film (Ti film) is preferable in terms of heat resistance, conductivity, and the like. Instead of a titanium film, a single layer formed of an element selected from tungsten (W), tantalum (Ta), molybdenum (Mo), neodymium (Nd), cobalt (Co), zirconium (Zr), zinc (Zn), ruthenium (Ru), rhodium (Rh), palladium (Pd), osmium (Os), iridium (Ir) and platinum (Pt), or an alloy material or a compound material containing the above element as its main component; or a single layer formed of nitride of the above element, for example, titanium nitride, tungsten nitride, tantalum nitride, or molybdenum nitride may be used. The number of times of deposition can be reduced in the manufacturing process, by formation of each of the wiring 1412, the connection electrode 1413, the terminal electrode 1414, and the source/drain electrode 1415 of the TFT 1500 as a single layer.

The top gate TFT 1500 using a polycrystalline silicon film can be formed through the above steps.

Figure 16A:
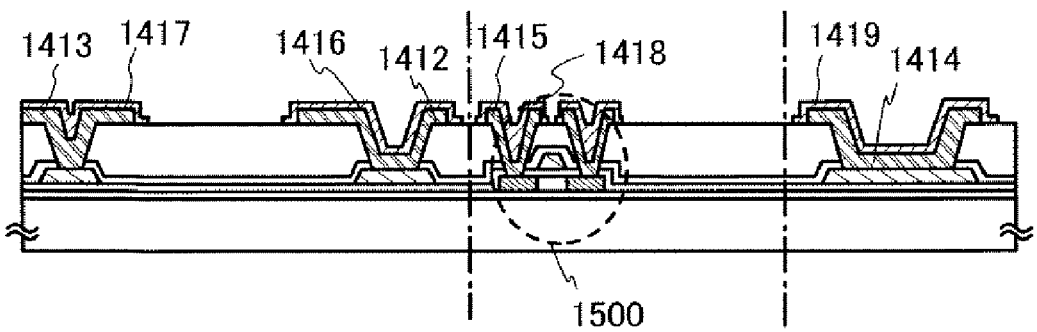
FIGS. 16A to 16C are cross-sectional views illustrating Embodiment 3.

Then, after formation of a conductive metal film (of titanium (Ti) or molybdenum (Mo), for example) which is not likely to be an alloy by reacting with a photoelectric conversion element (typically, amorphous silicon) which is formed later, a resist mask is formed using a fifth photomask, and then, the conductive metal film is selectively etched to form protective electrodes 1416, 1417, 1418, and 1419 which cover the wirings 1412 (see FIG. 16A). Here, a Ti film having a thickness of 200 nm obtained by a sputtering method is used. Similarly, the connection electrode 1413, the terminal electrode 1414, and the source/drain electrode 1415 of the TFT 1500 are covered with the conductive metal film. Accordingly, the conductive metal film also covers a side face where the second-layer Al film in these electrodes is exposed, and thus can prevent diffusion of an aluminum atom into the photoelectric conversion element.

Note that when the wiring 1412, the connection electrode 1413, the terminal electrode 1414, and the source/drain electrode 1415 of the TFT 1500 are formed of a single conductive film, the protective electrodes 1416, 1417, 1418, and 1419 are not necessarily formed.

Next, a photoelectric conversion layer 1420 including a p-type semiconductor layer 1420p, an i-type semiconductor element 1420i, and an n-type semiconductor layer 1420n is formed over the third interlayer insulating film 1411.

The p-type semiconductor layer 1420p may be formed by deposition of a semi-amorphous silicon film containing an impurity element belonging to Group 13 of the periodic table, such as boron (B), by a plasma CVD method.

Further, the wiring 1412 and the protective electrode 1416 are in contact with the bottom layer of the photoelectric conversion layer 1420, in this embodiment, the p-type semiconductor layer 1420p.

After the p-type semiconductor layer 1420p is formed, the i-type semiconductor element 1420i and the n-type semiconductor layer 1420n are sequentially formed. Accordingly, the photoelectric conversion layer 1420 including the p-type semiconductor layer 1420p, the i-type semiconductor element 1420i, and the n-type semiconductor layer 1420n is formed.

As the i-type semiconductor element 1420i, a semi-amorphous silicon film may be formed by a plasma CVD method, for example. Moreover, as the n-type semiconductor layer 1420n, a semi-amorphous silicon film containing an impurity element belonging to Group 15 of the periodic table, such as phosphorus (P), may be formed, or after formation of a semi-amorphous silicon film, an impurity element belonging to Group 15 of the periodic table may be introduced.

Alternatively, as the p-type semiconductor layer 1420p, the i-type semiconductor element 1420i, and the n-type semiconductor layer 1420n, an amorphous semiconductor film may be used as well as a semi-amorphous semiconductor film.

Figure 16B:
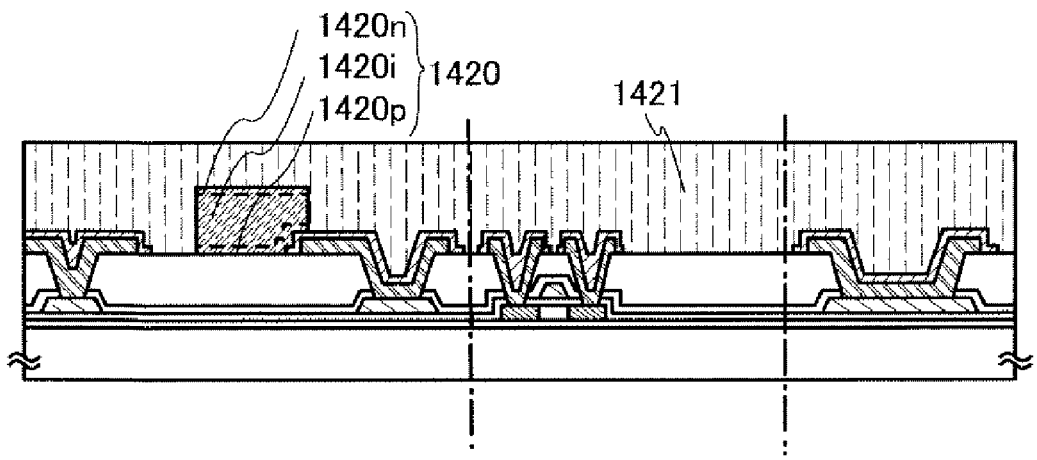

Next, a sealing layer 1421 is formed of an insulating material (e.g., an inorganic insulating film containing silicon) to have a thickness of 1 μm to 30 μm over the entire surface so that a state illustrates in FIG. 16B is obtained. Here, as the insulating film, a silicon oxide film containing nitrogen with a thickness of 1 μm is formed by a CVD method. By using the insulating film formed by CVD method, improvement in adhesion can be achieved.

Then, after the sealing layer 1421 is etched to provide an opening portion, terminal electrodes 1422 and 1423 are formed by a sputtering method. Each of the terminal electrodes 1422 and 1423 is a stacked film of a titanium film (Ti film) (100 nm), a nickel film (Ni film) (300 nm), and a gold film (Au film) (50 nm). The thus obtained terminal electrodes 1422 and 1423 have an adhesive strength of higher than 5 N, which is sufficient for the terminal electrode.

Figure 16C:
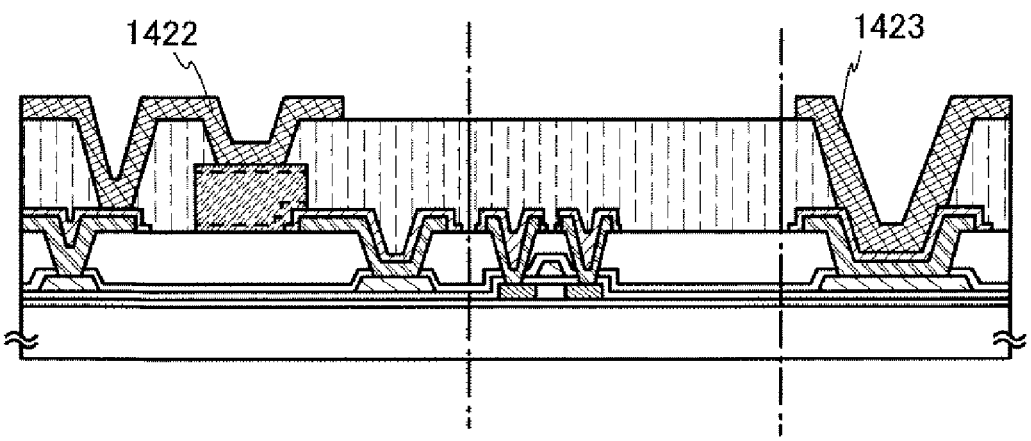

Through the above steps, the terminal electrodes 1422 and 1423 which can be connected by a solder are formed, and a structure illustrated in FIG. 16C can be obtained.

Note that the substrate is cut into separate sections to obtain a plurality of photoelectric conversion devices, whereby the photoelectric conversion device obtained by the above steps can be produced in large quantities. A large number of photoelectric conversion devices (e.g., 2 mm×1.5 mm) can be manufactured from one large-sized substrate (e.g., 600 cm×720 cm).

Note that the island-shaped semiconductor region 1403 shown in this embodiment can be manufactured by another manufacturing method without being limited to the above manufacturing method. For example, the island-shaped semiconductor region 1403 can be formed using an SOI (silicon on insulator) substrate. A known SOI substrate is used as the SOI substrate, and a manufacturing method and a structure thereof are not particularly limited to certain types. Typical examples of the SOI substrate are a SIMOX substrate and a bonded substrate. Moreover, examples of the bonded substrate are ELTRAN (registered trademark), UNIBOND (registered trademark), and Smart Cut (registered trademark).

In the case of a SIMOX substrate, an oxygen ion is introduced into a single crystal silicon substrate, and heat treatment is performed at 1300° C. or higher to form a buried oxide (BOX) layer, so that a thin silicon layer is formed on the surface and an SOI structure can be obtained. The thin silicon layer is insulated from the single crystal silicon substrate by the buried oxide layer. Further, a technique referred to as ITOX (internal thermal oxidation) in which thermal oxidation is further performed after a buried oxide layer is formed can be used.

A bonded substrate is an SOI structure which is obtained in such a manner that two single crystal silicon substrates (a first single crystal silicon substrate and a second single crystal silicon substrate) are bonded with an oxide layer interposed therebetween, and one of the single crystal silicon substrates is thinned from a surface on the side which is opposite to the bonded side, so that a thin silicon layer is formed on the surface. The oxide layer can be formed by thermal oxidation of one of the substrates (here, the first single crystal silicon substrate). Moreover, the two single crystal silicon substrates can be bonded directly without using an adhesive material.

Note that as the bonded substrate, an SOI substrate may be formed by bonding a substrate having an insulating surface, such as a glass substrate, and single crystal substrate, without being limited to bonding two single crystal substrates.

Note that what is illustrated in the drawing can be freely combined with or replaced with what is described in other embodiments as appropriate.

Embodiment 4

In the photoelectric conversion device, even when the amount of incident light is small, electric charge is accumulated in the capacitor so that light intensity can be detected. Moreover, the photoelectric conversion device can operate without increasing the number of elements such as a constant current source or a switch. Accordingly, by using the photoelectric conversion device, increase in manufacturing costs of an electronic device, which is caused by adding a photoelectric conversion device as its component, can he suppressed, and light in a dark place can be detected. The photoelectric conversion device can be included in display devices, laptop computers, and image reproducing devices provided with recording media (typically devices which reproduce the content of recording media such as DVDs (digital versatile disc) and have displays for displaying the reproduced images). Further, examples of electronic devices which can use the photoelectric conversion device are mobile phones, portable game machines, e-book readers, video cameras, digital still cameras, goggle-type displays (head mounted displays), navigation systems, and audio reproducing devices (e.g., car audio components and audio components). Specific examples of these electronic devices are illustrated in FIGS. 17A and 17B.

Figure 17A:
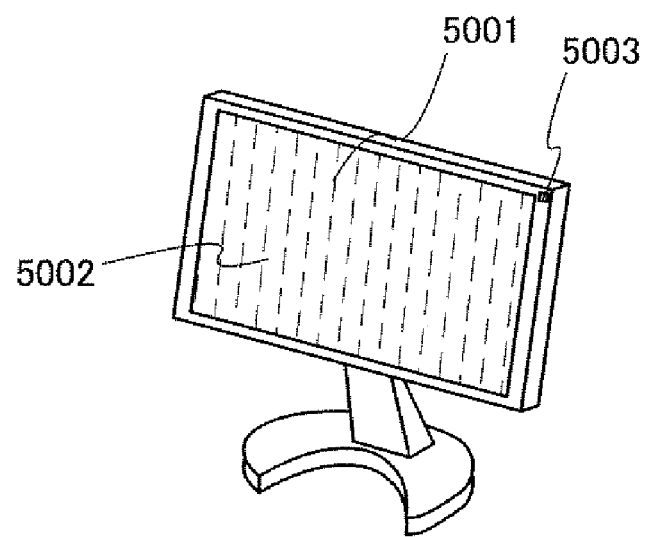
FIGS. 17A and 17B are views illustrating Embodiment 4.

FIG. 17A illustrates a display device including a housing 5001, a display portion 5002, a sensor portion 5003, and the like. The photoelectric conversion device can be used for the sensor portion 5003. The sensor portion 5003 detects external light intensity. In the display device, the luminance of the display portion 5002 can be controlled in accordance with the detected external light intensity. By controlling the luminance of the display portion 5002 in accordance with the external light intensity, power consumption of the display device can be suppressed. Note that the display device refers to any device for displaying information, for example, for a personal computer, for receiving TV broadcasting, and for displaying an advertisement.

Figure 17B:
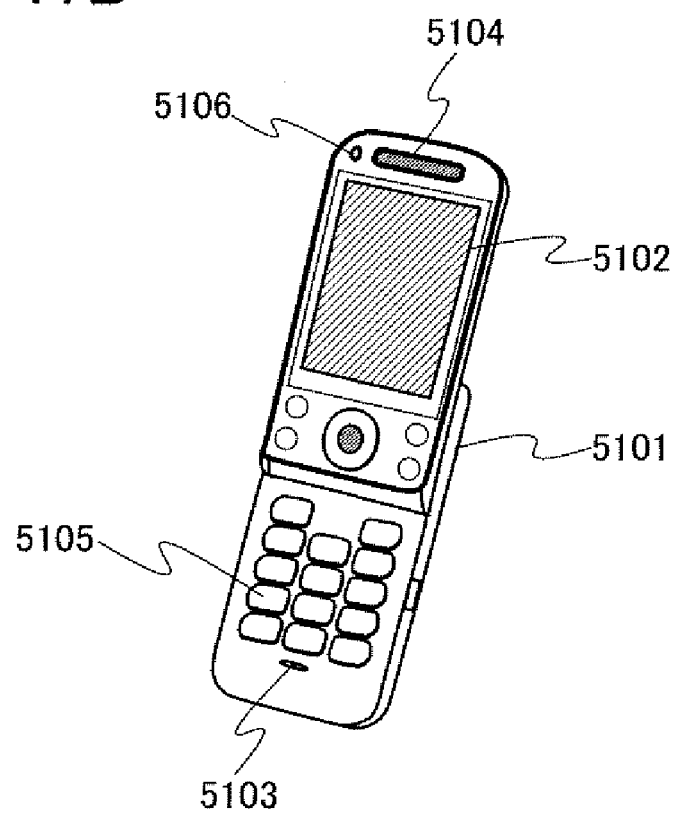

FIG. 17B illustrates a mobile phone including a main body 5101, a display portion 5102, an audio input portion 5103, an audio output portion 5104, operation keys 5105, a sensor portion 5106, and the like. The sensor portion 5106 detects external light intensity. In the mobile phone, the luminance of the display portion 5102 or the operation keys 5105 can be controlled in accordance with the detected external light intensity. By controlling the luminance of the display portion 5102 or the operation keys 5105 in accordance with detected external light intensity, power consumption of the mobile phone can be suppressed.

Note that what is illustrated in the drawing can be freely combined with or replaced with what is described in other embodiments as appropriate.

This application is based on Japanese Patent Application serial no. 2008-132835 filed with Japan Patent Office on May 21, 2008, the entire contents of which are hereby incorporated by reference.

What is claimed is:

1. A photoelectric conversion device comprising:
a photoelectric conversion circuit comprising:
a photoelectric conversion element formed over a substrate; and
an amplifier circuit configured to generate an amplified current from a current generated by irradiating the photoelectric conversion element with light, the amplifier circuit comprising a thin film transistor formed over the substrate;
a capacitor;
a first switch configured to control a supply of a first potential to one electrode of the capacitor;
a second switch configured to electrically connect the photoelectric conversion circuit to the one electrode of the capacitor; and
a comparator configured to compare a potential of the one electrode of the capacitor with a second potential.

2. The photoelectric conversion device according to claim 1, wherein the comparator is configured to output a result of comparison of the potential of the one electrode of the capacitor with the second potential as an output signal.

3. The photoelectric conversion device according to claim 2, further comprising:
a clock generation circuit configured to generate and output a clock signal;
a counter circuit configured to count up the clock signal in accordance with the output signal and outputting a count value; and
a latch circuit configured to hold the count value.

4. The photoelectric conversion device according to claim 1, wherein the substrate is a light-transmitting substrate.

5. An electronic device comprising the photoelectric conversion device according to claim 1.

6. A photoelectric conversion device comprising:
a photoelectric conversion circuit comprising:
a photoelectric conversion element formed over a substrate;
a first n-channel transistor formed over the substrate; and
a second n-channel transistor formed over the substrate,
wherein a gate of the first n-channel transistor is electrically connected to a gate of the second n-channel transistor, one of a source and a drain of the first n-channel transistor is electrically connected to the photoelectric conversion circuit, and the gate of the first n-channel transistor is electrically connected to the one of the source and the drain of the first n-channel transistor;
a capacitor;
a first switch configured to control a supply of a first potential to one electrode of the capacitor;
a second switch configured to electrically connect the photoelectric conversion circuit to the one electrode of the capacitor; and a comparator for comparing a potential of the one electrode of the capacitor with a second potential.

7. The photoelectric conversion device according to claim 6, wherein the comparator outputs a result of comparison of the potential of the one electrode of the capacitor with the second potential as an output signal.

8. The photoelectric conversion device according to claim 7, further comprising:
a clock generation circuit for generating and outputting a clock signal;
a counter circuit for counting up the clock signal in accordance with the output signal and outputting a count value; and
a latch circuit for holding the count value.

9. The photoelectric conversion device according to claim 6, wherein the first n-channel transistor, the second n-channel transistor, the first switch, and the second switch are thin film transistors.

10. The photoelectric conversion device according to claim 6, wherein the substrate is a light-transmitting substrate.

11. An electronic device comprising the photoelectric conversion device according to claim 6.

12. A photoelectric conversion device comprising:
a photoelectric conversion circuit comprising:
a photoelectric conversion element formed over a substrate;
a first p-channel transistor formed over the substrate; and
a second p-channel transistor formed over the substrate, wherein a gate of the first p-channel transistor is electrically connected to a gate of the second p-channel transistor, one of a source and a drain of the first p-channel transistor is electrically connected to the photoelectric conversion circuit, and the gate of the first p-channel transistor is electrically connected to the one of the source and the drain of the first p-channel transistor;
a capacitor;
a first switch configured to electrically connect one electrode of the capacitor to the other electrode of the capacitor;
a second switch configured to electrically connect the photoelectric conversion circuit to the one electrode of the capacitor; and
a comparator for comparing a potential of the one electrode of the capacitor with a second potential.

13. The photoelectric conversion device according to claim 12, wherein the comparator outputs a result of comparison of the potential of the one electrode of the capacitor with the second potential as an output signal.

14. The photoelectric conversion device according to claim 13, further comprising:
a clock generation circuit for generating and outputting a clock signal;
a counter circuit for counting up the clock signal in accordance with the output signal and outputting a count value; and
a latch circuit for holding the count value.

15. The photoelectric conversion device according to claim 12, wherein the first p-channel transistor, the second p-channel transistor, the first switch, and the second switch are thin film transistors.

16. The photoelectric conversion device according to claim 12, wherein the substrate is a light-transmitting substrate.

17. An electronic device comprising the photoelectric conversion device according to claim 12.

18. A method for driving a photoelectric conversion device including a first switch; a second switch; a capacitor; a photoelectric conversion circuit including a photoelectric conversion element, a first n-channel transistor and a second n-channel transistor wherein a gate of the first n-channel transistor is electrically connected to a gate of the second n-channel transistor, a drain of the first n-channel transistor and the photoelectric conversion element; and a comparator, the method comprising the steps of:
charging the capacitor by turning on the first switch to supply a first potential to one electrode of the capacitor,
discharging the capacitor by turning off the first switch and turning on the second switch so that an amplified current flows into the second n-channel transistor in accordance with a current generated by irradiating the photoelectric conversion element with light, and
outputting a result of comparison of a potential of the one electrode of the capacitor with a second potential as an output signal from the comparator.

19. The method for driving a photoelectric conversion device according to claim 18, the photoelectric conversion device further comprising a latch circuit, the method further comprising the step of:
holding a count value of a clock signal by the latch circuit from the time of turning on the second switch until a potential change of the output signal.

20. A method for driving a photoelectric conversion device including a first switch; a second switch; a capacitor; a photoelectric conversion circuit including a photoelectric conversion element, a first p-channel transistor and a second p-channel transistor wherein a gate of the first p-channel transistor is electrically connected to a gate of the second p-channel transistor, a drain of the first p-channel transistor and the photoelectric conversion element; and a comparator, the method comprising the steps of:
discharging the capacitor by turning on the first switch to electrically connect one electrode of the capacitor to the other electrode of the capacitor,
charging the capacitor by turning off the first switch and turning on the second switch so that an amplified current flows into the second p-channel transistor in accordance with a current generated by irradiating the photoelectric conversion element with light, and
outputting a result of comparison of a potential of the one electrode of the capacitor with a second potential as an output signal from the comparator.

21. The method for driving a photoelectric conversion device according to claim 20, the photoelectric conversion device further comprising a latch circuit, the method further comprising the step of:
holding a count value of a clock signal by the latch circuit from the time of turning on the second switch until a potential change of the output signal.

* * * * *